(12) United States Patent  
Chiwata

(10) Patent No.: US 7,826,096 B2  
(45) Date of Patent: Nov. 2, 2010

(54) IMAGE PROCESSING METHOD AND IMAGE RECORDING APPARATUS

(75) Inventor: Yuhei Chiwata, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 37 days.

(21) Appl. No.: 11/521,312

(22) Filed: Sep. 15, 2006

(65) Prior Publication Data

US 2007/0070424 A1    Mar. 29, 2007

(30) Foreign Application Priority Data

Sep. 16, 2005    (JP)    ............................. 2005-270730

(51) Int. Cl.
*H04N 1/21*    (2006.01)
*G06K 9/00*    (2006.01)

(52) U.S. Cl. ..................................... 358/3.04; 382/252

(58) Field of Classification Search ................. 358/3.03
See application file for complete search history.

(56) References Cited

U.S. PATENT DOCUMENTS

| | | | |
|---|---|---|---|
| 4,924,322 A | 5/1990 | Kurosawa et al. | |
| 6,144,775 A * | 11/2000 | Williams et al. | ............. 382/252 |
| 6,172,768 B1 * | 1/2001 | Yamada et al. | ................ 358/1.9 |
| 6,173,081 B1 * | 1/2001 | Nishikawa | ................... 382/252 |
| 6,529,150 B1 * | 3/2003 | Shoop et al. | ................ 341/137 |
| 6,563,957 B1 * | 5/2003 | Li et al. | ........................ 382/252 |
| 6,625,327 B1 | 9/2003 | Ohshima et al. | |
| 6,956,675 B2 * | 10/2005 | Nose | .......................... 358/3.03 |
| 6,972,873 B1 * | 12/2005 | Usui et al. | .................. 358/3.04 |
| 6,999,201 B1 * | 2/2006 | Shimizu | ..................... 358/3.04 |
| 7,009,731 B1 | 3/2006 | Yamamoto | |
| 7,031,025 B1 * | 4/2006 | He et al. | ..................... 358/3.09 |

(Continued)

FOREIGN PATENT DOCUMENTS

JP    1-238373 A    9/1989

(Continued)

OTHER PUBLICATIONS

An Office Action issued on Jun. 1, 2010 for Japanese Application No. 2006-251327.

*Primary Examiner*—Twyler L Haskins
*Assistant Examiner*—Mesfin Getaneh
(74) *Attorney, Agent, or Firm*—Birch, Stewart, Kolasch & Birch, LLP

(57) ABSTRACT

The image processing method converts an input image having multiple tones into an image having fewer tones than the input image, for image recording by a recording head including a plurality of recording elements arranged in a prescribed direction. The pixel values of pixels of the input image are quantized in a processing direction which is set to a direction substantially parallel to a relative conveyance direction of a recording medium with respect to the recording elements when recording onto the recording medium is performed by means of the recording elements. The pixel value for a pixel under processing is quantized according to the result of a comparison between the pixel value for the pixel under processing and a threshold value for the pixel under processing. An error with respect to the pixel under processing caused by quantizing the pixel value for the pixel under processing is diffused into an unprocessed pixel in a periphery of the pixel under processing. A threshold value for the unprocessed pixel of the input image is determined in accordance with the diffused error.

1 Claim, 32 Drawing Sheets

U.S. PATENT DOCUMENTS

| | | | |
|---|---|---|---|
| 7,289,248 B2 * | 10/2007 | Yamazaki | 347/15 |
| 2001/0019632 A1 * | 9/2001 | Shibaki et al. | 382/252 |
| 2001/0050780 A1 | 12/2001 | Ohshima | |
| 2002/0039200 A1 | 4/2002 | Yamamoto | |
| 2002/0054354 A1 * | 5/2002 | Fukao | 358/3.04 |
| 2002/0063746 A1 * | 5/2002 | Suzuki et al. | 347/19 |
| 2002/0122210 A1 * | 9/2002 | Mitchell Ilbery | 358/3.04 |
| 2002/0181003 A1 * | 12/2002 | Kakutani | 358/1.13 |
| 2003/0031373 A1 * | 2/2003 | Kempf | 382/251 |
| 2004/0104951 A1 | 6/2004 | Shibata et al. | |
| 2004/0263910 A1 | 12/2004 | Chang et al. | |
| 2005/0007635 A1 * | 1/2005 | Kang et al. | 358/3.04 |
| 2005/0008245 A1 * | 1/2005 | Katougi et al. | 382/254 |
| 2005/0025374 A1 * | 2/2005 | Ishikawa | 382/252 |
| 2005/0259884 A1 * | 11/2005 | Murakami et al. | 382/252 |
| 2006/0061616 A1 * | 3/2006 | Yamazaki | 347/19 |
| 2007/0046706 A1 * | 3/2007 | Kayahara et al. | 347/14 |

FOREIGN PATENT DOCUMENTS

| | | |
|---|---|---|
| JP | 6-225124 A | 8/1994 |
| JP | 9-135351 A | 5/1997 |
| JP | 2000-165669 A | 6/2000 |
| JP | 2001-160901 A | 6/2001 |
| JP | 2002-64706 A | 2/2002 |
| JP | 2002-112030 A | 4/2002 |
| JP | 2004-58282 A | 2/2004 |
| JP | 2004-186910 A | 7/2004 |
| JP | 2004-230672 A | 8/2004 |
| JP | 2005-20733 A | 1/2005 |

* cited by examiner

CORRELATION BETWEEN LINE CORRECTION COEFFICIENT AND PRINT DUTY RATIO

RECORDING MEDIUM CONVEYANCE DIRECTION

RECORDING MEDIUM CONVEYANCE DIRECTION

RECORDING MEDIUM CONVEYANCE DIRECTION

RECORDING MEDIUM CONVEYANCE DIRECTION

RECORDING MEDIUM CONVEYANCE DIRECTION

RECORDING MEDIUM CONVEYANCE DIRECTION

BINARIZATION PROCESSING DIRECTION

BINARIZATION PROCESSING DIRECTION

BINARIZATION PROCESSING DIRECTION

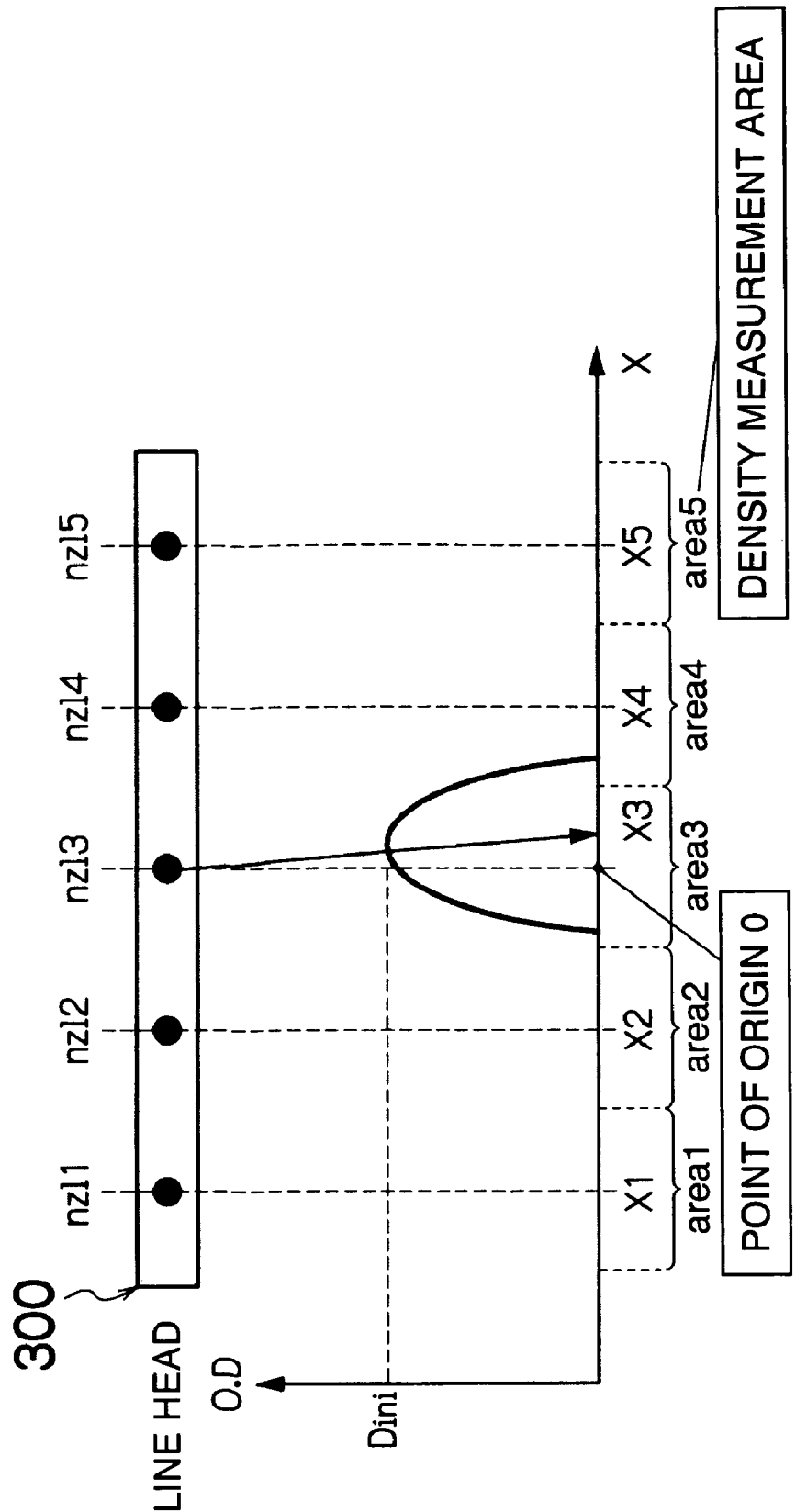

Related Art

Related Art

FIG.31

|  | 6-2 1/1 | 6-5 0/1 |
|---|---|---|
| 6-1 * | | 6-4 0/1 |
| | | 6-3 0/1 |

Related Art

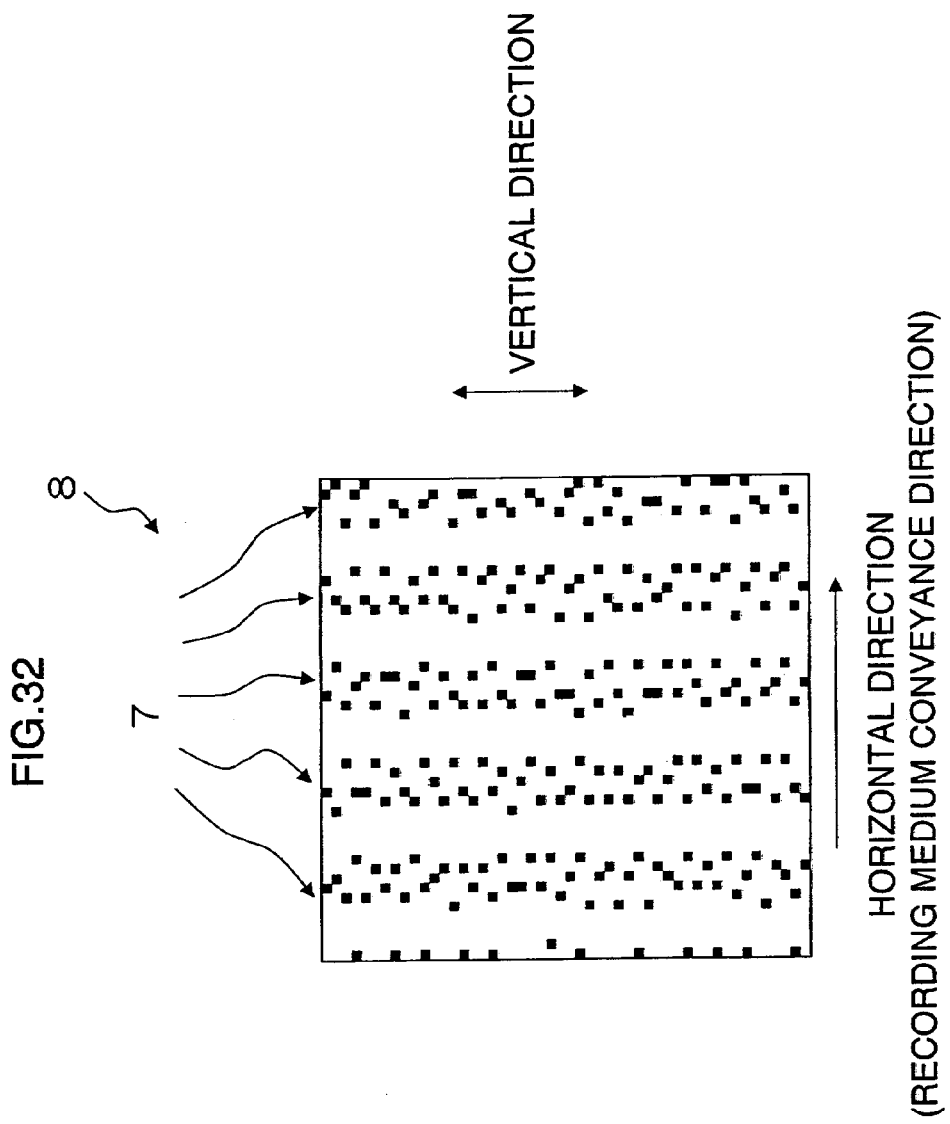

IMAGE PROCESSING METHOD AND IMAGE RECORDING APPARATUS

BACKGROUND OF THE INVENTION

1. Field of the Invention

The present invention relates to an image processing method and an image recording apparatus, and more particularly, to image processing technology for an image recording apparatus which forms an image on a recording medium by using a recording head formed with a plurality of recording elements (nozzles) arranged two-dimensionally at high density.

2. Description of the Related Art

In an inkjet recording apparatus, there is a problem in that streak-shaped density non-uniformities (hereinafter, simply called "non-uniformities") occur due to variations in the recording characteristics of the recording elements provided in the head (for example, the ejection characteristics of the nozzles which eject liquid droplets), and technologies for correcting the ejection characteristics of nozzles by image processing have been proposed.

Here, one example of technology for correcting the ejection characteristics of nozzles in image processing according to the related art is described below with respect to FIGS. 26 to 32. In FIGS. 26 to 32, parts which are similar to or the same as those in FIGS. 1 to 25 are labeled with the same reference numerals.

FIG. 26 is a diagram showing image processing according to the related art. As shown in FIG. 26, when image data 1 of 256 tonal graduations is received, a line correction processing unit 14 multiplies the image data 1 by correction coefficients 12 (line correction coefficients $d_i$) based on the previously established ejection characteristics of the nozzles, thereby corrected image data with generating 256 tonal graduations (the object image in FIG. 1) 16.

The line correction coefficients $d_i$ used in the line correction coefficient processing unit 14 (where i is the nozzle number of the nozzle 522-$i$ provided in the head 520 shown in FIG. 29, and i=1 to 8), are generated for the respective nozzles by a line correction coefficient generation unit 2, by means of various steps, such as printing a test pattern, measuring the test pattern, and creating nozzle density correction coefficients. The correction coefficients thus generated are stored in a prescribed storage unit. The corrected image data 16 created by correction based on the line correction coefficients $d_i$ generated in this way is then subjected to halftoning (for example, quantization based on an error diffusion method) in a binarization processing unit (halftoning unit) 20, thereby creating binary (multiple-value) output data (print data) 22.

FIG. 27 is a block diagram of the image processing block which is explained with reference to FIG. 26 and in which the image processing is executed. In general, a so-called error diffusion method is suitable for use in generating a binary (multiple-value) image of high quality and good reproducibility with respect to an input image. In such an error diffusion method, binarization processing is carried out in the binarization processing direction indicated by the arrowed line in FIG. 27, for each pixel in the corrected image (object image) 16 which has been subjected to the line correction processing.

In other words, in the binarization processing unit 20, the pixel values of the processed pixels (for example, values in the range of 0 to 255 in the 8-bit data) are compared with the threshold values generated by the threshold value generation unit 40, and binary output data 22 (0/255) is derived on the basis of these comparison results.

Furthermore, in the error calculation unit 24, the error between the data of the object image 16 and the output data 22 is calculated. In the error diffusion processing unit 28, correction data for an error diffusion process of the error determined by the error calculation unit 24 is calculated by means of an error diffusion filter 26. In the error diffusion process, the error in the pixel under processing is diffused into the peripheral pixels. The correction data is stored temporarily in the error buffer 30.

In the input value correction unit 32, the input data I of the peripheral pixels of the pixel under processing is corrected on the basis of the correction data stored in the error buffer 30, and is rewritten as input data I' after the error diffusion processing. The binarization processing unit 20 then carries out binarization processing on the input data I' after the error diffusion processing, which has been rewritten in the way as mentioned above.

FIG. 28 shows one example of an error diffusion filter 26. Of the unprocessed pixels, the error diffusion filter 26 shown in FIG. 28 diffuses 7/16 of the error into the adjacent pixel 26-2 on the right-side of the pixel under processing 26-1, and it diffuses 3/16 of the error into the lower left-side pixel 26-3, 5/16 of the error into the pixel 26-4 directly below, and 1/16 of the error into the lower right-side pixel 26-5. The binarization processing direction of the error diffusion filter 26 shown in FIG. 28 is the left to right direction in FIG. 28 (the direction indicated by the arrowed line).

Furthermore, the error diffusion processing described above is represented as follows:

$$E(i, j) = O(i, j) - I(i, j), \tag{1}$$

$$I'(i, j) = I(i, j) - I\_cor(i, j), \tag{2}$$

$$I\_cor(i, j) = \Sigma M(k, l) \cdot E(i-k, j-1), \tag{3}$$

where I is the input data, O is the output data, E is the binarization error, I' is the corrected input data, and M is the error diffusion filter.

Japanese Patent Application Publication No. 2004-230672 discloses an image processing method which corrects density non-uniformities caused by errors in the ink volume ejected from nozzles, and Japanese Patent Application Publication No. 2004-58282 discloses an image processing method which corrects density non-uniformities caused by depositing position errors of the ink ejected from the nozzles.

According to the related art technology described above, there is a possibility that, if quantization processing is carried out on corrected image data which has undergone correction (density non-uniformity correction) processing in respect of the nozzle ejection characteristics by using an error diffusion method, then the correction of density non-uniformities is insufficient and non-uniformities can be visually perceived in the recorded image.

More specifically, as shown in FIG. 29, if binarization processing is carried out by the binarization processing unit 20 using error diffusion processing, with respect to an object image 16 (not shown in FIG. 29; see FIG. 26) obtained by multiplying the data of an input image 1 (see FIG. 26) by the line correction coefficient $d_i$, then some degree of error occurs between the line correction coefficient $d_i$ and the print duty ratio 12' ($e_i$; where i is the number of the nozzle 4-$i$ provided in the head 3, and i=1 to 8). The print duty ratio $e_i$ represents the ratio of the region in which dots are actually disposed with respect to the region in which dots can be formed, for each nozzle 4-$i$. From the viewpoint of correcting non-uniformities, it is desirable that the print duty ratio $e_i$ and the line correction coefficient $d_i$ should be equal.

FIG. 30 shows a graph indicating the correlation between the line correction coefficient $d_i$ and the print duty ratio $e_i$. This graph is created by actually preparing line correction coefficients $d_i$ for a head having 512 nozzles, calculating the print duty ratio $e_i$ after binarization processing using an error diffusion method, and then plotting marks representing the correlation between the two values, $d_i$ and $e_i$. In order to achieve desirable correction of density non-uniformities, preferably, the value of the line correction coefficient $d_i$ and the value of the print duty $e_i$ are substantially the same (situated on the straight line 5 shown in FIG. 30); however, in actual practice, an error arises between the two values.

In response to these problems, Japanese Patent Application Publication No. 6-225124 discloses an error diffusion method having the characteristic of maintaining the line correction coefficient $d_i$ in consequence. More specifically, the error is diffused only in a one-dimensional direction (binarization processing direction) by using a diffusion processing filter 6 as shown in FIG. 31. Hence, the error in the pixel 6-1 under processing is diffused only into the unprocessed pixel in the horizontal direction (in FIG. 31, the adjacent pixel 6-2 on the right-side of the pixel 6-1 under processing), and the error is not diffused into the lower left-side pixel 6-3, the pixel 6-4 directly below, and the lower right-side pixel 6-5. In other words, the error occurring during binarization processing of the image data corresponding to a particular nozzle 4-$i$ is not diffused into the image data corresponding to the other nozzles, and therefore the line correction coefficient $d_i$ is conserved as the print duty ratio $e_i$.

However, according to the image processing method described in Japanese Patent Application Publication No. 6-225124, error is not diffused into the peripheral pixels in the direction perpendicular to the binarization processing direction (namely, the conveyance direction of the recording medium). In other words, there is no function for compensating for the dispersion of the dots in the direction parallel to the relative conveyance direction of the recording medium, and therefore dots are disposed in a continuous fashion in the vertical direction and artifacts (unevenness) 7 having a longitudinal striped shape following the vertical direction arise as shown in FIG. 32.

Japanese Patent Application Publication No. 6-225124 discloses a method for suppressing artifacts 7 occurring in the image 8 shown in FIG. 32, by adjusting the threshold values in the vertical direction used in binarization processing so as to alter the sequence of the formation of dots with respect to each line in the horizontal direction. According to this method described in Japanese Patent Application Publication No. 6-225124, the artifacts shown in FIG. 32 are reduced; however, it has been confirmed by experimentation carried out by the inventor who contrives the present invention that unsightly artifacts do occur, depending on the tonal graduations in density.

SUMMARY OF THE INVENTION

The present invention has been contrived in view of the aforementioned circumstances, an object thereof being to provide an image processing method and an image recording apparatus which suppress density non-uniformities and artifacts occurring in a recorded image.

In order to attain the aforementioned object, the present invention is directed to an image processing method for converting an input image having multiple tones into an image having fewer tones than the input image, for image recording by a recording head including a plurality of recording elements arranged in a prescribed direction, the method comprising the steps of: quantizing pixel values of pixels of the input image in a processing direction which is set to a direction substantially parallel to a relative conveyance direction of a recording medium with respect to the recording elements when recording onto the recording medium is performed by means of the recording elements, the pixel value for a pixel under processing being quantized according to a result of a comparison between the pixel value for the pixel under processing and a threshold value for the pixel under processing; diffusing an error with respect to the pixel under processing caused by quantizing the pixel value for the pixel under processing, into an unprocessed pixel in a periphery of the pixel under processing; and determining a threshold value for the unprocessed pixel of the input image in accordance with the error.

According to the present invention, the threshold value used in quantization processing of an unprocessed pixel is determined in accordance with the error occurring in quantization processing of a particular pixel under processing. Therefore, the dot dispersion in the direction substantially parallel to the quantization processing direction is improved, and artifacts occurring in the recorded image in the direction substantially perpendicular to the quantization processing direction are suppressed.

The recording elements may be nozzles which eject liquid onto a recording medium, LED elements which irradiate LED light onto a recording medium, or the like. Dots are formed on the recording medium by the liquid ejected from the nozzles or the LED light irradiated by the LED elements, for example, and a desired image is formed on the recording medium by combining a plurality of such dots.

The pixel values of the input image may include, for example, density values. Furthermore, the quantization processing includes image processing for converting the input image into a binary image or a multiple-value image (a ternary image, or the like).

The recording head may be a line head in which recording elements are arranged through a length corresponding to the full width of the recording medium. A line head may be formed to a length corresponding to the full width of the recording medium by combining short heads which do not reach a length corresponding to the full width of the recording medium, these short heads being joined together in a staggered matrix fashion.

In a mode where the recording head comprises nozzles ejecting liquid, the ink ejected from the nozzles may be an ink used in an inkjet recording apparatus, resist, or other liquid chemical, or a treatment liquid, or the like.

Moreover, the "recording medium" is a medium on which liquid ejected from nozzles is deposited, or a medium which receives the irradiation of LED light, for example. This term "recording medium" includes various types of media, irrespective of material and size, such as continuous paper, cut paper, sealed paper, resin sheets such as PHP sheets, film, cloth, and other materials. The recording medium may also be called a print medium, or the like.

Preferably, the image processing method further comprises the step of correcting the input image in accordance with recording characteristics of the recording elements, wherein the input image which has been corrected in accordance with the recording characteristics of the recording elements is converted into the image having fewer tones than the input image.

Since an input image is corrected in accordance with the recording characteristics of the recording elements and the corrected input image is then subjected to quantization processing, it is possible to suppress density non-uniformities occurring in the recorded image due to differences in the recording characteristics of the recording elements.

The difference in the recording characteristics of the recording elements may be due to deviation in the formation position of the dots formed on the recording medium, deviation in the size of the dots, deviation in the density of the dots, or the like. One mode of correcting the recording characteristics in this way is a mode in which the correction coefficients corresponding to the recording characteristics of the recording elements are determined, and the input image is then multiplied (computed) by these correction coefficients.

In order to attain the aforementioned object, the present invention is also directed to an image processing method for converting an input image having multiple tones into an image having fewer tones than the input image, for image recording by a recording head including a plurality of recording elements arranged in a prescribed direction, the method comprising the steps of: correcting the input image in accordance with recording characteristics of the recording elements; quantizing pixel values of pixels of the corrected input image in a processing direction which is set to a direction substantially parallel to a relative conveyance direction of a recording medium with respect to the recording elements when recording onto the recording medium is performed by means of the recording elements, the pixel value for a pixel under processing being quantized according to a result of a comparison between the pixel value for the pixel under processing and a threshold value for the pixel under processing; and diffusing an error with respect to the pixel under processing caused by quantizing the pixel value for the pixel under processing, into an unprocessed pixel in a periphery of the pixel under processing in accordance with the recording characteristics of the recording medium.

According to the present invention, error diffusion processing is carried out on an unprocessed pixel in accordance with the recording characteristics of the recording elements, and therefore the correction of the input image is sustained satisfactorily in accordance with the recording characteristics of the recording elements, and the occurrence of artifacts in the recorded image is suppressed.

In order to attain the aforementioned object, the present invention is also directed to an image recording apparatus, comprising: a recording head in which a plurality of recording elements are arranged in a prescribed direction; a quantization processing device which quantizes pixel values of pixels of an input image in a processing direction which is set to a direction substantially parallel to a relative conveyance direction of a recording medium with respect to the recording elements when recording onto the recording medium is performed by means of the recording elements, the pixel value for a pixel under processing being quantized according to a result of a comparison between the pixel value for the pixel under processing and a threshold value for the pixel under processing; an error diffusion device which diffuses an error with respect to the pixel under processing caused by quantizing the pixel value for the pixel under processing, into an unprocessed pixel in a periphery of the pixel under processing; and a threshold value determination device which determines a threshold value for the unprocessed pixel of the input image in accordance with the error.

The image recording apparatus may include a so-called image forming apparatus, and it may be an inkjet recording apparatus which forms a desired image by ejecting ink onto the recording medium, an LED electrophotographic printer (recording apparatus) which forms a desired image by radiating LED light from LED elements onto the recording medium, or the like.

Preferably, the image recording apparatus further comprises an image correction device which corrects the input image in accordance with recording characteristics of the recording elements, wherein the input image which has been corrected in accordance with the recording characteristics of the recording elements is converted into the image having fewer tones than the input image.

Preferably, if a plurality of the unprocessed pixels are in the periphery of the pixel under processing, the threshold value determination device determines the threshold values for the unprocessed pixels by correcting initial threshold values for the unprocessed pixels by means of a diffusion filter having a two-dimensional matrix format, the initial threshold values being set previously.

According to the present invention, it is possible to improve the dispersion of the dots formed on the recording medium by using a diffusion filter having a two-dimensional matrix format in the threshold value determination device (threshold value alteration device). Furthermore, the image recording apparatus in the present invention may have a threshold value storage device which stores previously determined threshold values or corrected threshold values (updated threshold values).

Preferably, if a plurality of the unprocessed pixels are in the periphery of the pixel under processing, the threshold value determination device determines a threshold value with respect to each of the unprocessed pixels.

According to the present invention, threshold values for quantization processing are determined for each processing pixel (each pixel subjected to quantization processing), and therefore desirable quantization processing in which the dispersion of the dots is improved is achieved.

Preferably, if a plurality of the unprocessed pixels are in the periphery of the pixel under processing, the error diffusion device diffuses the error into at least one of the unprocessed pixels which is, with respect to the pixel under processing, in a direction for an error diffusion processing.

According to the present invention, the error occurring in quantization processing is diffused only in a direction in one dimension, namely, the processing direction for the error diffusion processing. Therefore, it is possible to prevent the correction corresponding to the recording characteristics of each recording element from affecting the formation of the dots by the other recording elements, and satisfactory dot dispersion can be achieved.

In order to attain the aforementioned object, the present invention is also directed to an image recording apparatus, comprising: a recording head in which a plurality of recording elements are arranged in a prescribed direction; an image correction device which corrects an input image in accordance with recording characteristics of the recording elements; a quantization processing device which quantizes pixel values of pixels of the corrected input image in a processing direction which is set to a direction substantially parallel to a relative conveyance direction of a recording medium with respect to the recording elements when recording onto the recording medium is performed by means of the recording elements, the pixel value for a pixel under processing being quantized according to a result of a comparison between the pixel value for the pixel under processing and a threshold value for the pixel under processing; and an error diffusion device which diffuses an error with respect to the pixel under processing caused by quantizing the pixel value for the pixel under processing, into an unprocessed pixel in a periphery of the pixel under processing in accordance with the recording characteristics of the recording medium.

The mode of determining a threshold value by means of the threshold value determination device may be one in which the initial value of previously established threshold value (stored in a prescribed storage device) is corrected.

Preferably, if a plurality of the unprocessed pixels are in the periphery of the pixel under processing, the error diffusion device diffuses the error into the unprocessed pixels by using a diffusion filter having a two-dimensional matrix format.

Preferably, if a plurality of the unprocessed pixels are in the periphery of the pixel under processing, the error diffusion device increases weighting of the diffusion filter in terms of a direction for an error diffusion processing, in a region of the corrected input image corresponding to at least one of the recording elements which has a large recording error.

According to the present invention, high correction accuracy is required in a region corresponding to a recording element having large recording error, and therefore by increasing the weighting in the processing direction for the error quantization processing, the result of correction corresponding to the recording characteristics of the recording elements is maintained satisfactorily, even after the quantization processing, and hence desirable correction of non-uniformities can be achieved. Furthermore, in a region corresponding to a low recording error, it is desirable to use a diffusion filter which is capable of diffusing the error two-dimensionally.

According to the present invention, a threshold value to be used in quantization processing of an unprocessed pixel is determined in accordance with the error occurring in quantization processing, and therefore the dot dispersion in the recorded image is improved in the direction substantially parallel to the relative conveyance direction of the recording medium with respect to the plurality of recording elements when recording onto the recording medium is performed by means of the plurality of recording elements. Therefore, the occurrence of artifacts in the recorded image is suppressed. Furthermore, in a mode in which error diffusion processing is carried out on an unprocessed pixel in accordance with the recording characteristics of the recording elements, the correction of the input image is sustained satisfactorily in accordance with the recording characteristics of the recording elements, and the occurrence of artifacts in the recorded image is suppressed.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIG. 10 is an illustrative diagram showing an example of a density profile before correction for density non-uniformities;

FIG. 31 is a diagram for describing a further example of an error diffusion filter relating to the related art; and FIG. 32 is a diagram showing an image which has undergone image processing according to the related art.

DETAILED DESCRIPTION OF THE PREFERRED EMBODIMENTS

First Embodiment

Figure 1:
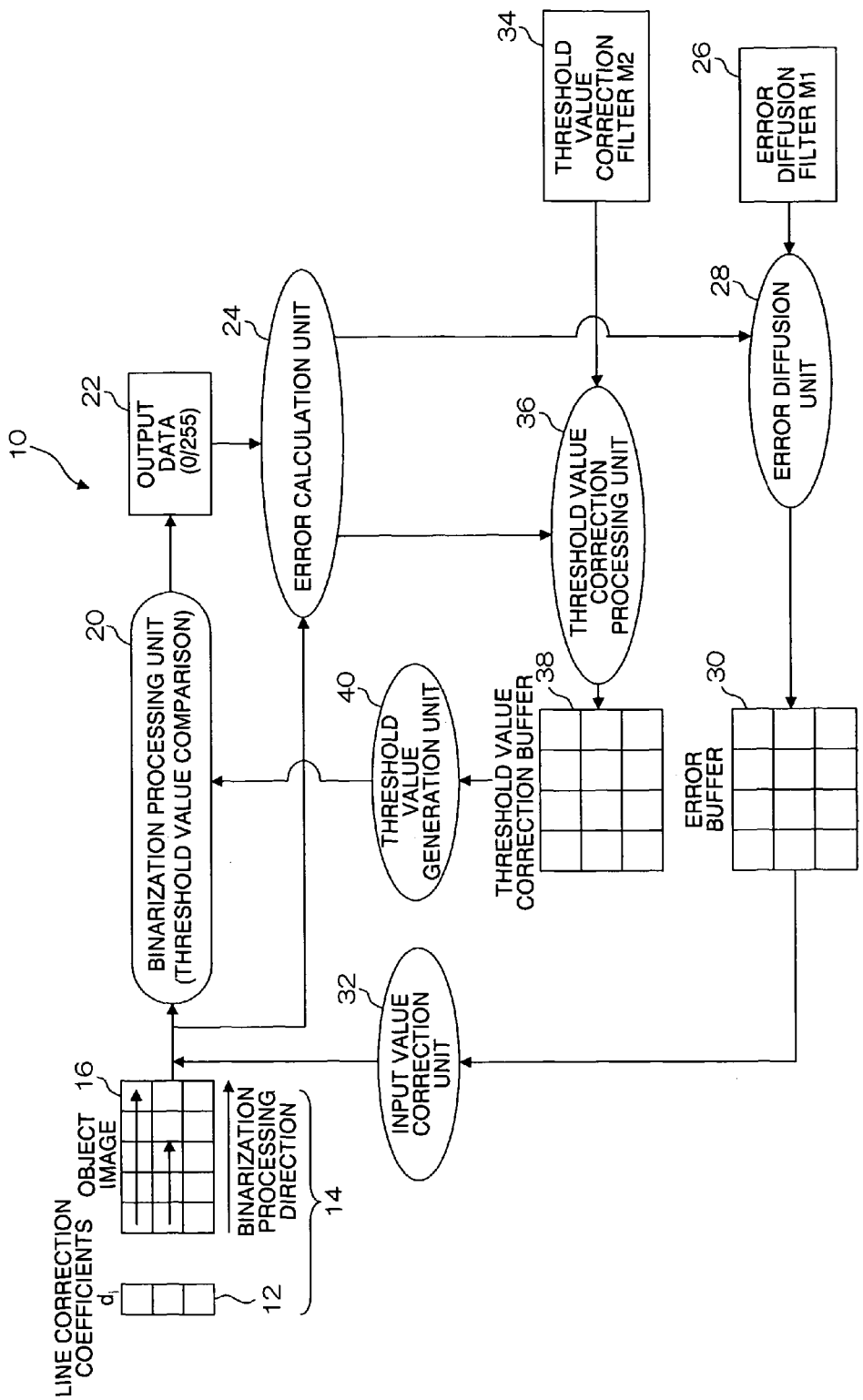
FIG. 1 is a block diagram showing an approximate composition of an image processing block relating to a first embodiment of the present invention.
Figure 26:
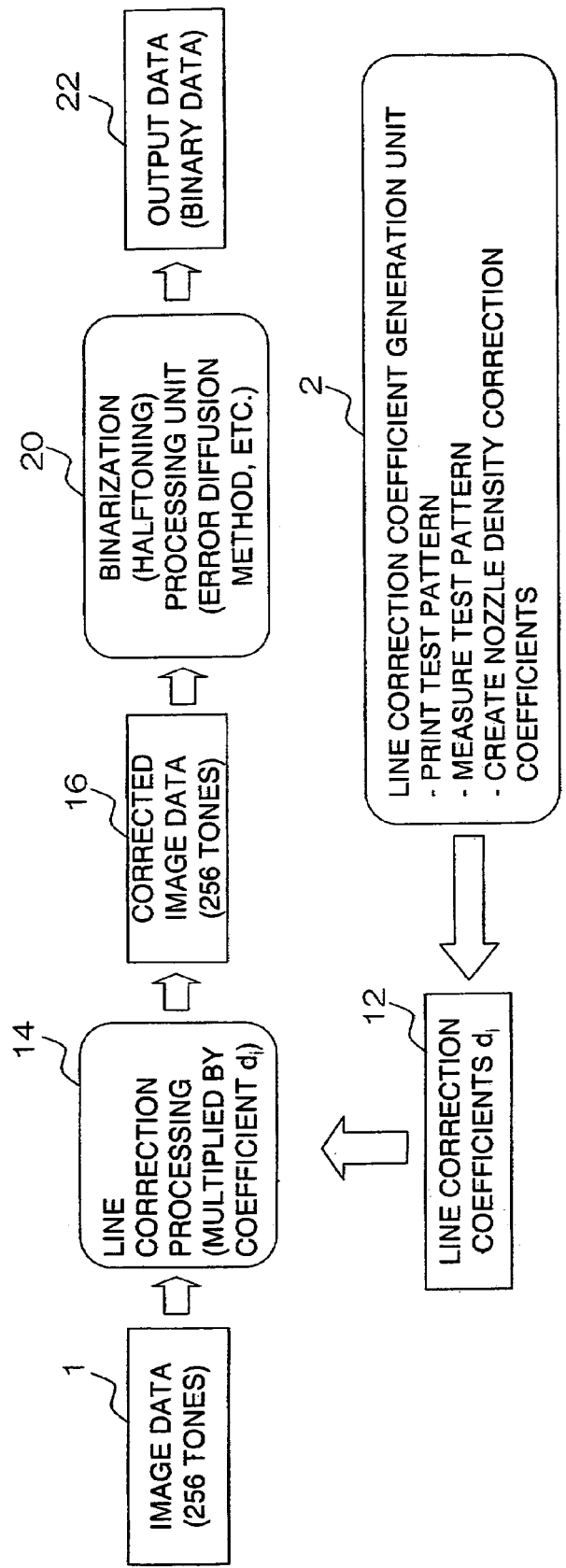
FIG. 26 is an illustrative diagram showing a sequence of image processing relating to the related art.
Figure 27:
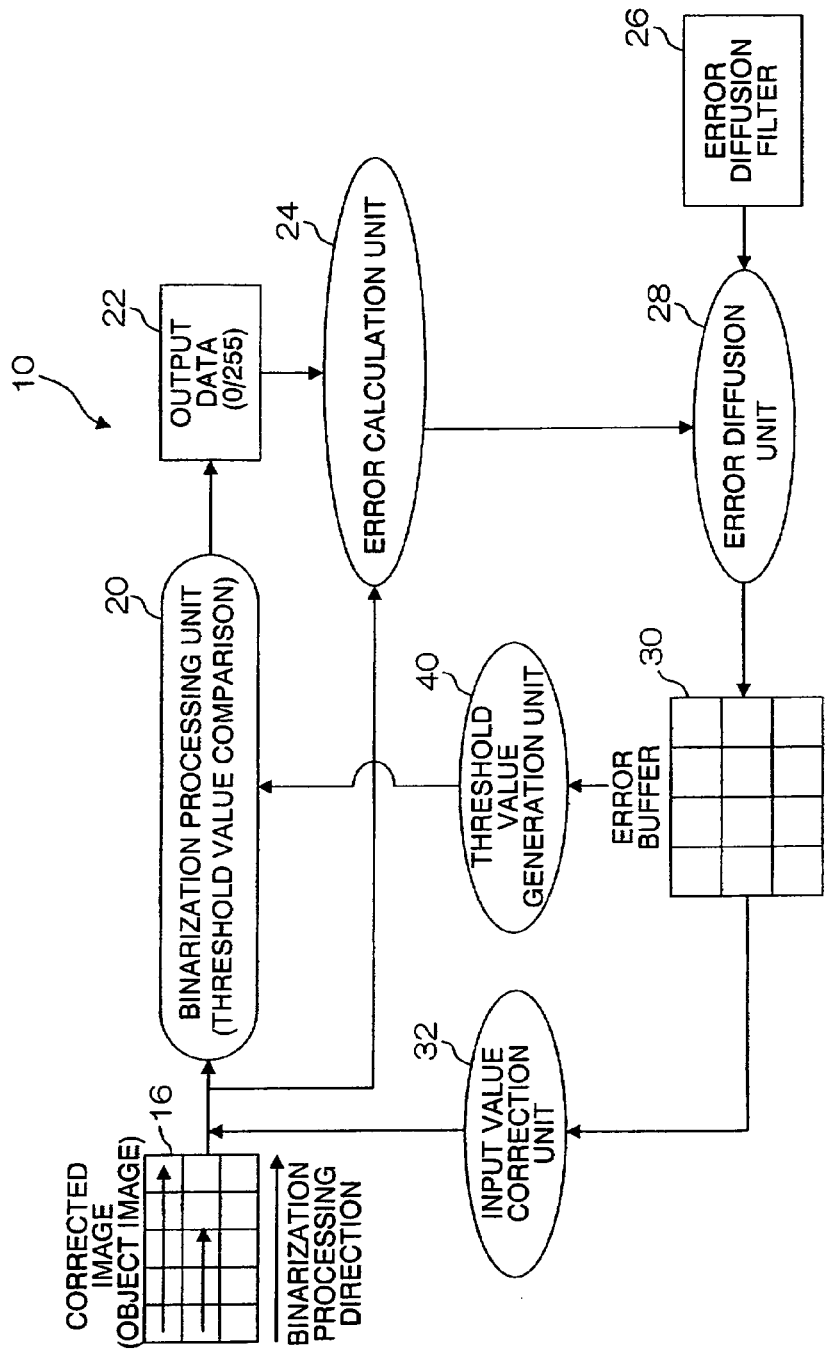
FIG. 27 is a block diagram showing the approximate composition of an image processing block relating to the related art.

FIG. 1 is a block diagram of an image processing block 10 which executes an image processing method according to a first embodiment of the present invention. The image processing block 10 shown in FIG. 1 comprises: a line correction processing unit 14 which multiplies line correction coefficients 12 ($d_i$) corresponding to the recording characteristics of the respective recording elements by the input data (density value, which is in the range of 0 to 255); a binarization processing unit 20, which performs binarization processing (or multiple-value conversion processing) in a prescribed processing direction (indicated by arrows in FIG. 1) with respect to an object image 16 for binarization processing whose data has been multiplied by the line correction coefficients $d_i$ (where i is the number of the nozzle (recording element) 4-$i$ provided in the head 3 shown in FIG. 29; and i=1, 2, . . . ); and an error calculation unit 24, which calculates the error between the object image 16 and the output data 22 (0/255) obtained from the binarization processing unit 20. The object image 16 referred to here corresponds to the corrected image (corrected image data) 16 shown in FIGS. 26 and 27.

Furthermore, as shown in FIG. 1, the image processing block 10 also comprises: an error diffusion processing unit 28, which diffuses the error calculated by the error calculation unit 24 into the unprocessed pixels peripheral to the pixel under processing by means of an error diffusion filter 26 (M1); an error buffer 30, which stores the error to be diffused into the peripheral pixels; an input value correction unit 32, which corrects the input value of each of the unprocessed pixels on the basis of the error stored in the error buffer 30; a threshold value correction processing unit 36, which corrects a threshold value for each of the unprocessed peripheral pixels by means of a threshold value correction filter 34 (M2) in accordance with the error determined by the error calculation unit 24; a threshold value correction buffer 38, which stores the corrected values of the threshold values for the unprocessed pixels; and a threshold value generation unit 40, which generates (corrects) the threshold value for each of the unprocessed pixels on the basis of the corrected values of the threshold values stored in the threshold value correction buffer 38.

In the line correction processing unit 14, density non-uniformities which occur in the recorded image due to the recording characteristics of the recording elements, are corrected by multiplying the data of the input image (corresponding to the image data 1 in FIG. 22) by line correction coefficients $d_i$ determined in accordance with the recording characteristics of the recording elements (for example, the density characteristics). In order to generate the line correction coefficients $d_i$, it is possible to use a method disclosed in Japanese Patent Application Publication No. 2004-230672 or a method disclosed in Japanese Patent Application Publication No. 2004-058282, and it is also possible to use the line correction coefficient setting method described hereinafter.

In the binarization processing unit 20, output data O(i,j) is obtained by carrying out binarization processing based on a threshold value T(i,j) with respect to the input data (density value) I(i,j) of the pixel under processing which has undergone density correction processing using a line correction coefficient $d_i$. The threshold value T(i,j) may be non-uniform in spatial terms. Here, "I(i,j)=0, 1, 2, . . . , 255" is satisfied, and O(i,j) has a binary value of 0 or 255. Furthermore, a 0 value for O(i,j) represents non-printing of a dot, and 255 represents printing of a dot. Furthermore, i represents the recording element number, and j represents the pixel number in the conveyance direction of the recording medium.

The error E(i,j) determined by the error calculation unit 24 is represented as follows:

$$E(i,j)=O(i,j)-I(i,j) \qquad (4)$$

The input data for the unprocessed pixels which are peripheral to the pixel under processing is corrected on the basis of the error E(i,j) expressed by the formula (4) above. The error diffusion filter M1(k,l) shown in FIG. 1 is used for this correction processing. Here, k is a recording element number (corresponding to i), and l is a pixel number in the recording medium conveyance direction (corresponding to j).

In other words, the input data I'(i,j) for an unprocessed pixel into which error has been diffused is expressed as follows:

$$I'(i,j)=I(i,j)-I\_cor(i,j), \qquad (5)$$

$$I\_cor(i,j)=\Sigma M1(k,l) \cdot E(i-k,j-l). \qquad (6)$$

Figure 29:
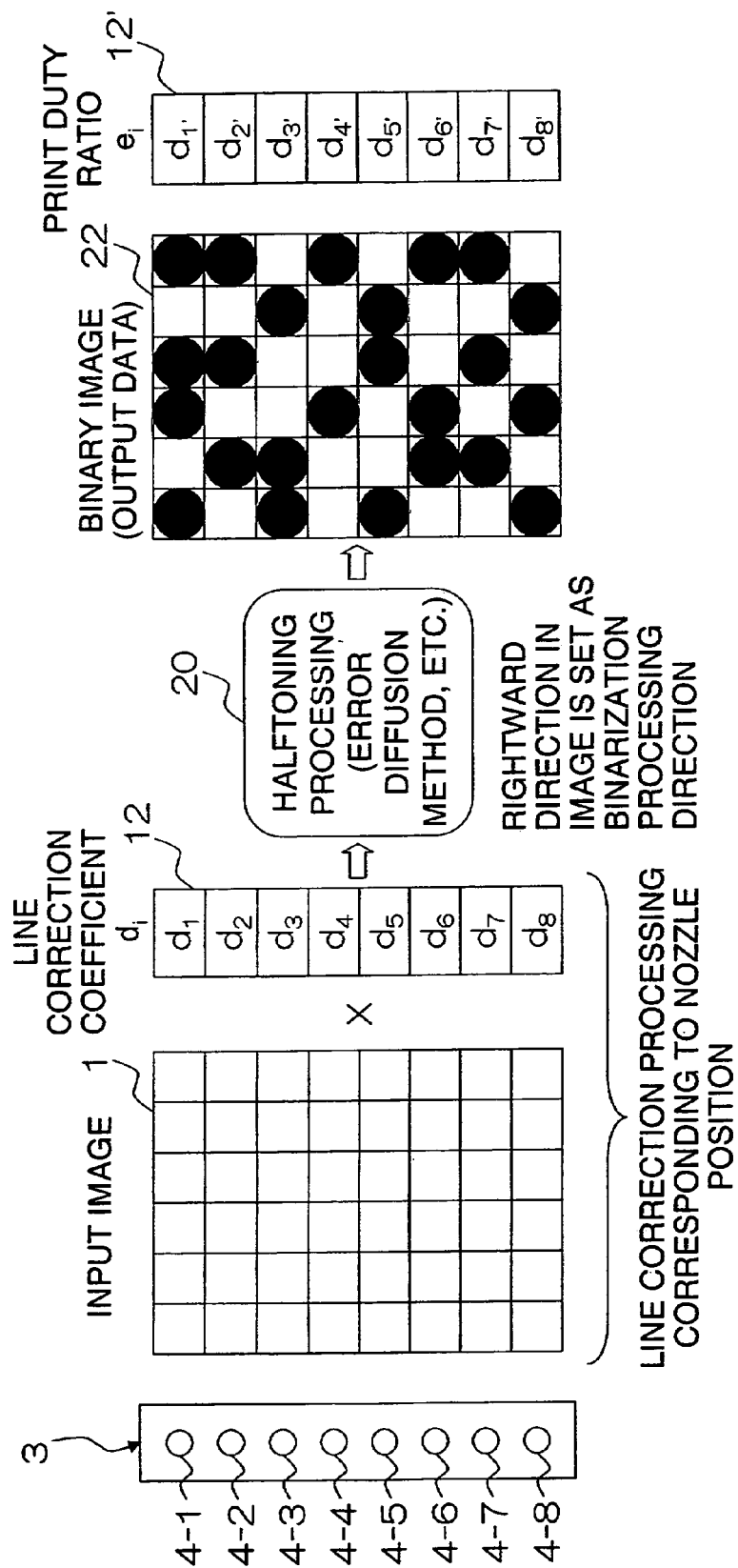
FIG. 29 is an illustrative diagram describing the line correction coefficient and the print duty ratio.
Figure 30:
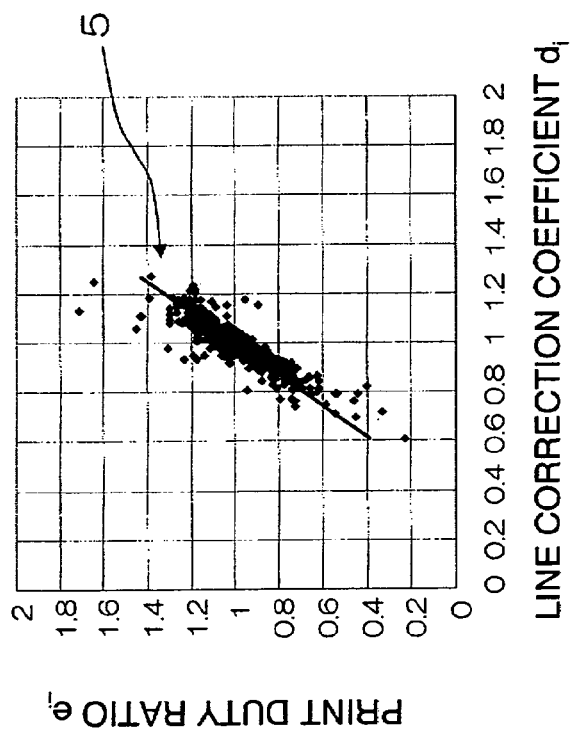
FIG. 30 is a diagram showing the correlation between the line correction coefficient and the print duty ratio in an image processing method according to the related art.
Figure 31:
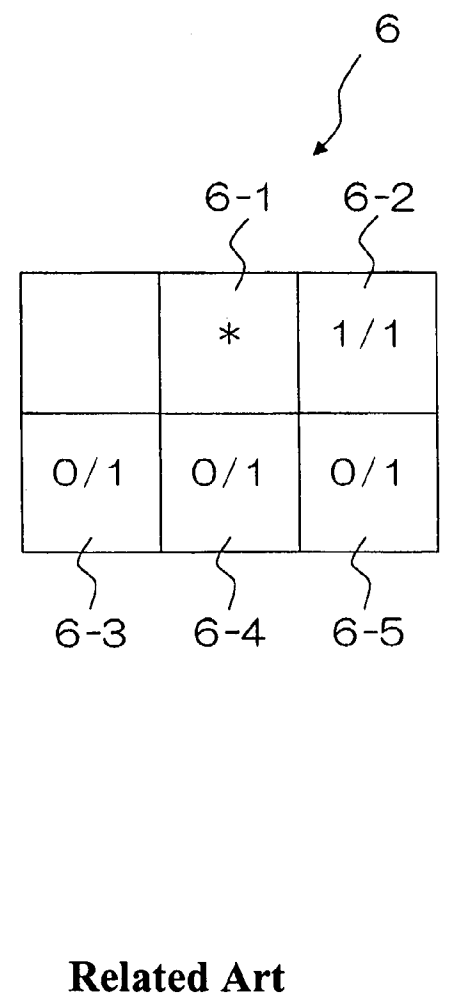

In order to conserve the line correction coefficient $d_i$ (to ensure that the line correction coefficient $d_i$ and the print duty ratio $e_i$ shown in FIG. 29 are substantially the same), the filter 6 shown in FIG. 31 is used as the error diffusion filter M1. In other words, in the binarization processing (error diffusion processing) according to the present embodiment, the error E(i,j) is diffused only into an unprocessed pixel in the binarization processing direction (only in a direction in one dimension). As shown in FIG. 31, the error E(i,j) occurring during pixel 6-2 on the right-side of the pixel under processing 6-1.

In the image processing described in the present embodiment, the threshold value T(i, j) is updated to the threshold value T'(i,j) for each of the unprocessed pixels peripheral to the pixel under processing, by correcting the threshold value T(i,j) on the basis of the error E(i,j) expressed by the formula (4) described above. In other words, each time that binarization processing is carried out on a certain pixel, the updated threshold value T'(i,j) is obtained for each of the peripheral unprocessed pixels. This threshold value T'(i,j) is expressed by the following formula:

$$T'(i,j)=T(i,j)-T\_cor(i,j), \qquad (7)$$

$$T\_cor(i,j)=\Sigma M2(k,l) \cdot E(i-k,j-l). \qquad (8)$$

Figure 2:
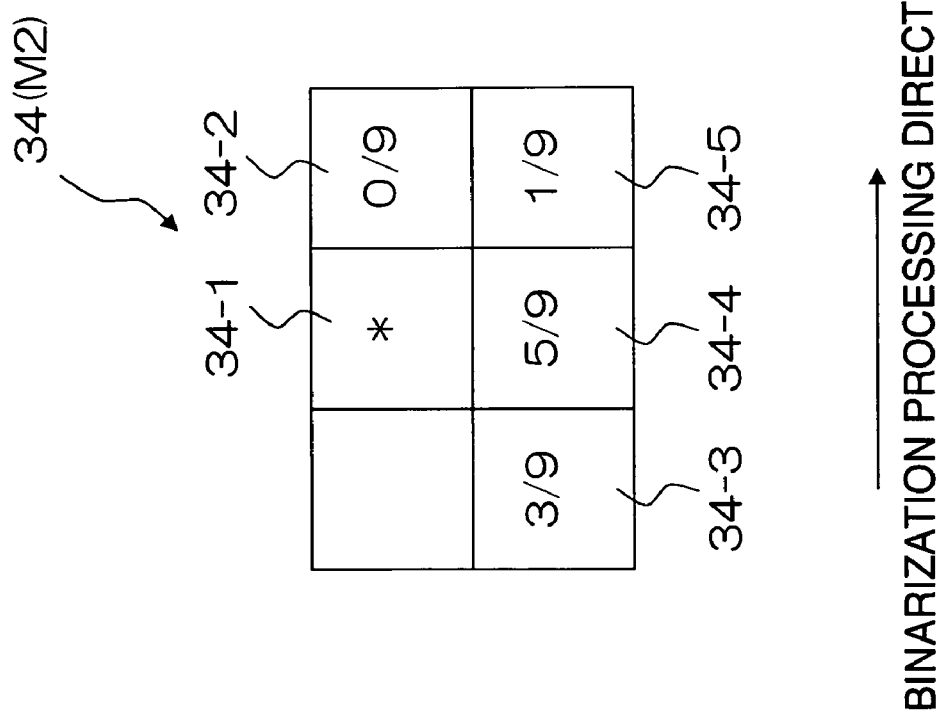
FIG. 2 is an illustrative diagram showing one example of the threshold value correction filter shown in FIG. 1.

In the threshold value correction processing unit 36 shown in FIG. 1, the processing expressed by the formulas (7) and (8) above is carried out on the basis of the error E(i,j) calculated by the error calculation unit 24, by using the threshold value correction filter 34 (M2) shown as an example in FIG. 2. The threshold value correction filter 34 shown in FIG. 2 is a filter which aims to improve the dot dispersion characteristics in the direction parallel to the binarization processing direction. The correction value corresponding to the (right-side adjacent) pixel 34-2, which is adjacent to the pixel 34-1 under processing in the binarization processing direction, is 0/9(0), and the correction values corresponding to the pixels 34-3, 34-4, and 34-5 adjacent to the pixel 34-1 under processing in the vertical direction are, respectively, 3/9, 5/9 and 1/9.

In this correction of the threshold values, in order to improve the dot dispersion, desirably, the formation of dots is suppressed in the periphery of a pixel where a dot is to be formed, and desirably, the values of the threshold value correction filter 34 are positive.

Figure 3:
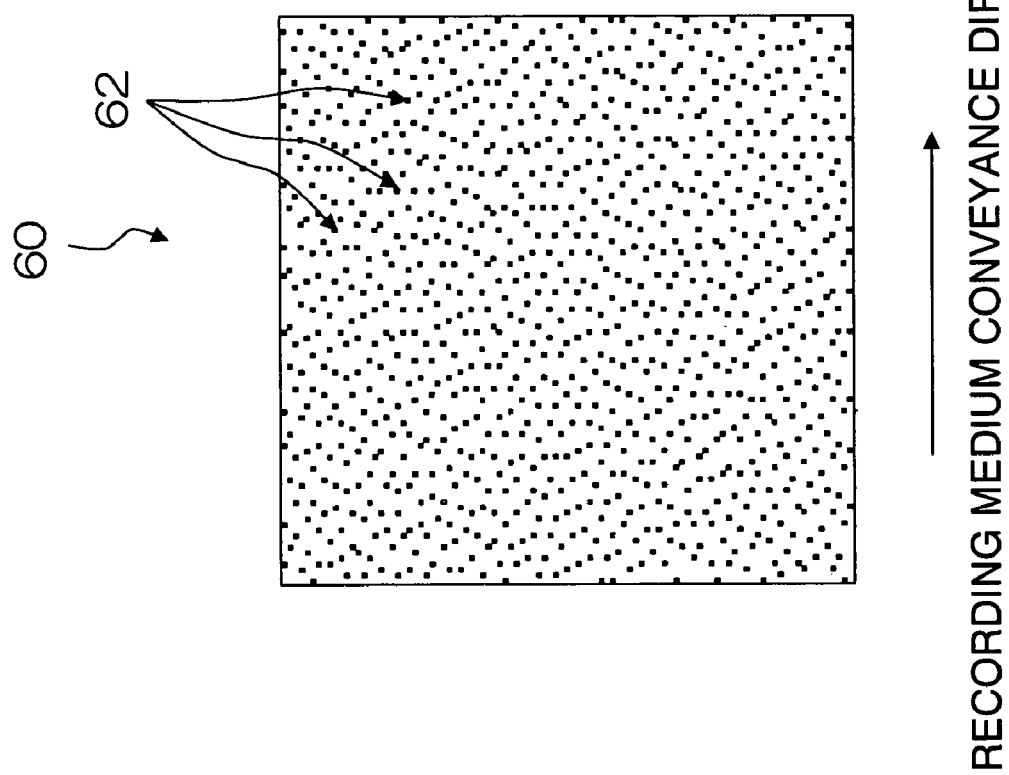
FIG. 3 is a diagram describing an image which has undergone image processing by the image processing block shown in FIG. 1.
Figure 4:
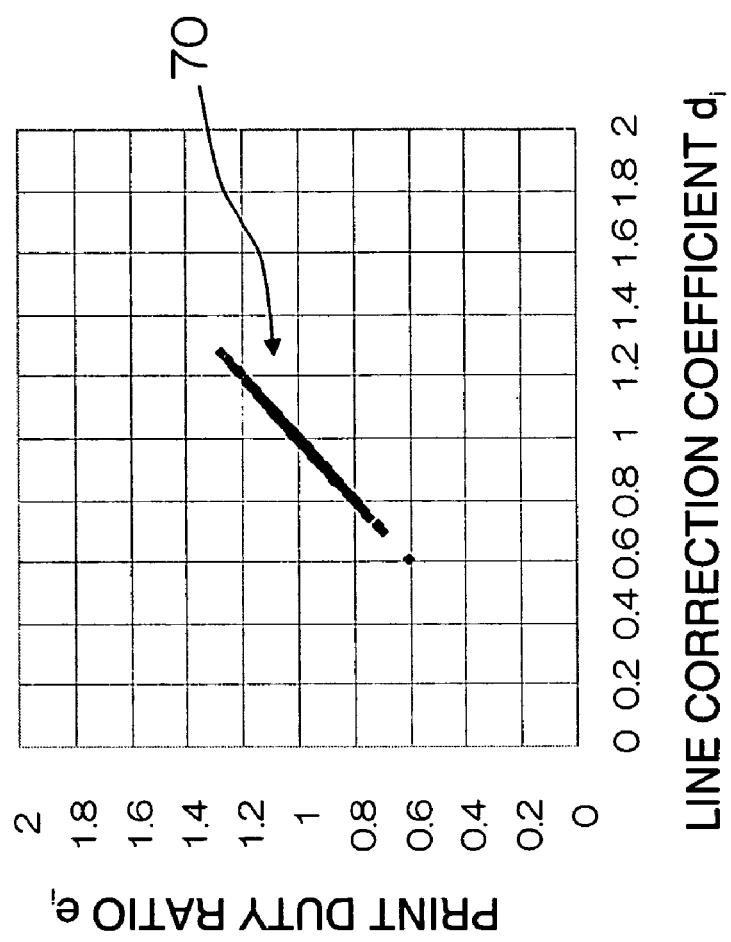
FIG. 4 is a diagram showing the correlation between a line correction coefficient and the print duty ratio relating to the image processing method according to an embodiment of the present invention.
Figure 28:
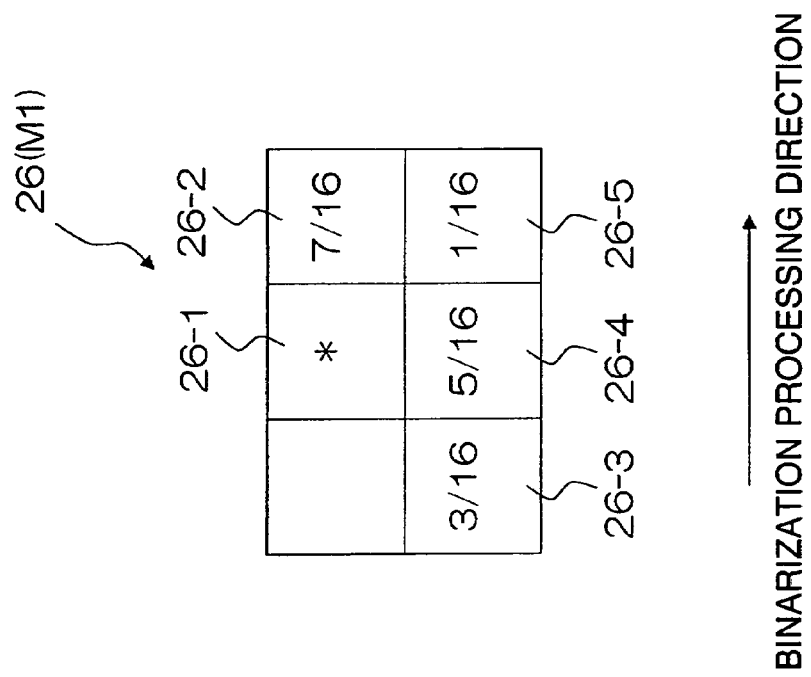
FIG. 28 is a diagram for describing one example of an error diffusion filter relating to the related art.

FIG. 3 shows an image 60 which has been subjected to the image processing shown in the present embodiment, and FIG. 4 shows the correlation between the line correction coefficient $d_i$ and the print duty ratio $e_i$ of the image 60. As shown in FIG. 3, in the image 60, the dots 62 are dispersed satisfactorily, and it can be seen that artifacts 390, such as those shown in FIG. 28, do not occur.

Furthermore, as shown in FIG. 4, it can be seen that the value of the line correction coefficient $d_i$ and the value of the print duty ratio $e_i$ are substantially the same (they are situated on the straight line 70 shown in FIG. 4), and since the line correction coefficient $d_i$ is conserved even after binarization processing, then satisfactory density correction (non-uniformity correction) is performed.

Figure 5A:
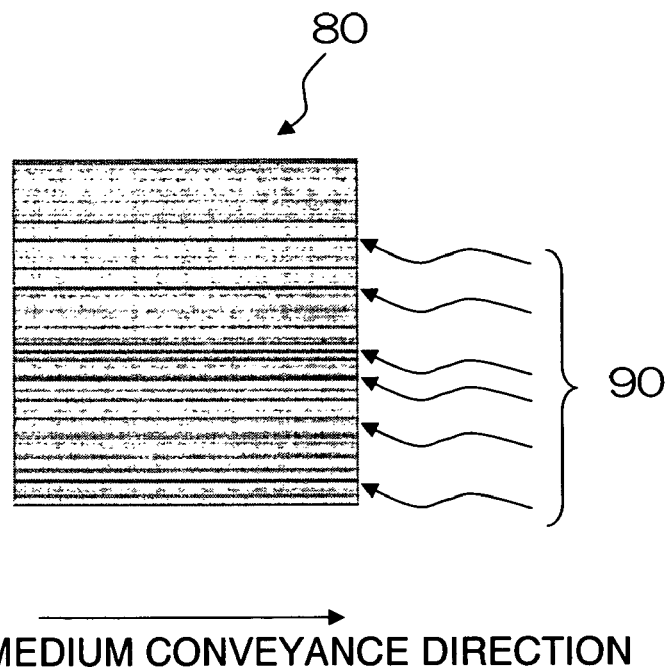
FIGS. 5A and 5B are diagrams showing an image which has not undergone correction based on the recording characteristics of the recording elements.
Figure 5B:
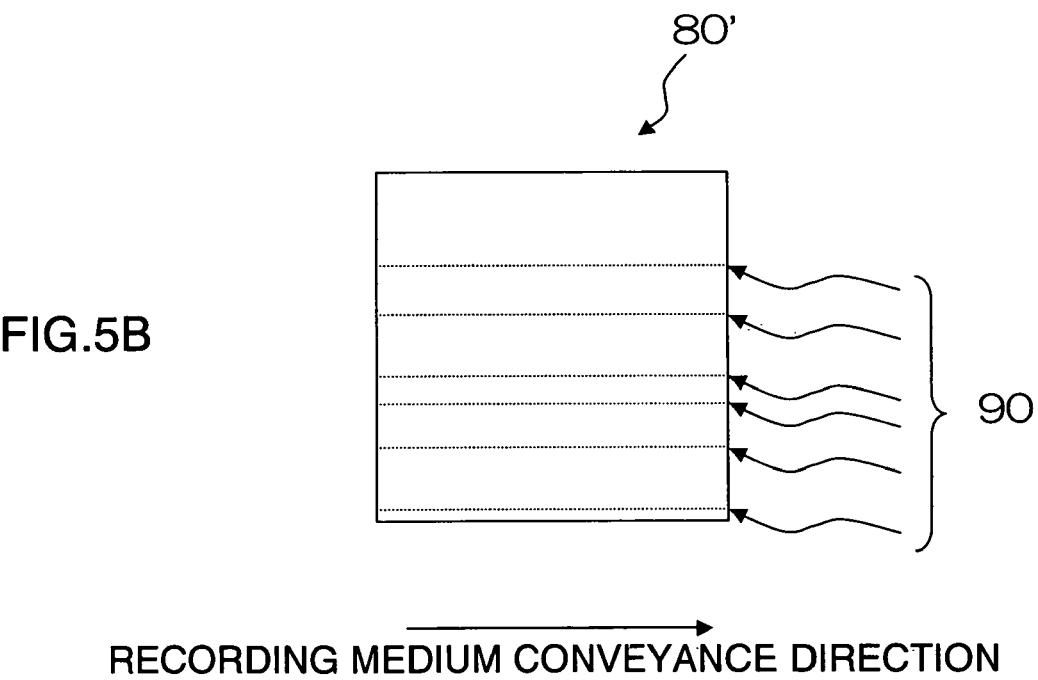
Figure 6A:
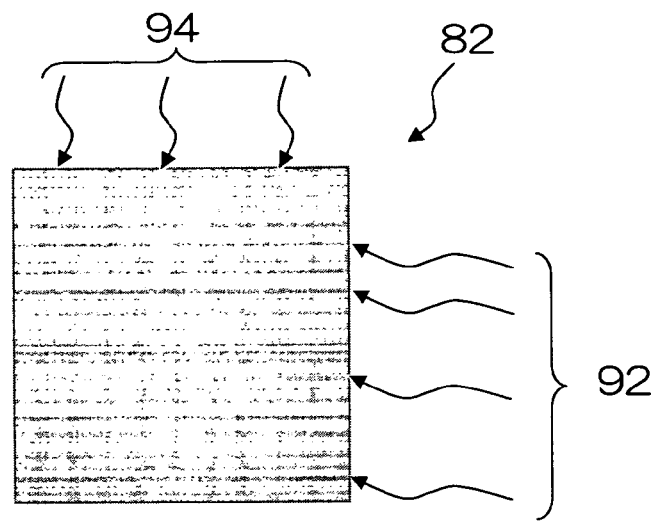
FIGS. 6A and 6B are diagrams showing an image which has undergone correction based on the recording characteristics of the recording elements according to the related art.
Figure 6B:
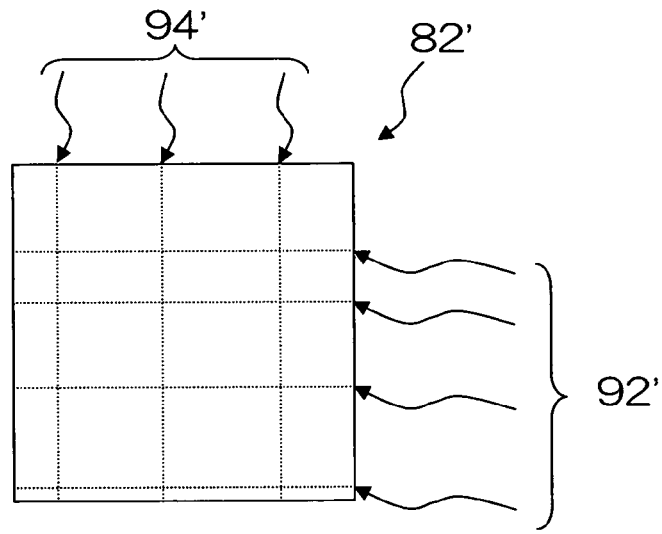
Figure 7A:
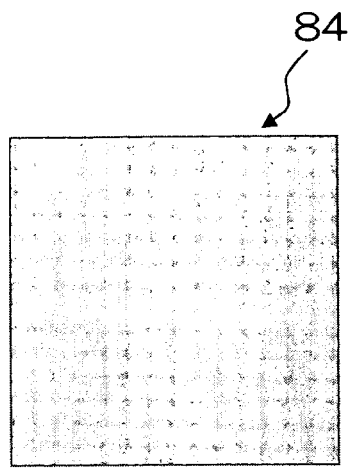
FIGS. 7A and 7B are diagrams showing an image which has undergone correction on the basis of the recording characteristics of the recording elements according to the present invention.

Here, FIG. 5A shows an image 80 in which density correction processing has not been carried out on the basis of the recording characteristics of the recording elements, and FIG. 6A shows an image 82 in which image processing relating to the related art has been carried out (namely, density correction processing has been carried out on the basis of the recording characteristics of the recording elements and error diffusion processing has been carried out using fixed threshold values). Furthermore, FIG. 7A shows an image 84 in which image processing according to the above embodiment of the present invention has been carried out (namely, density correction processing has been carried out on the basis of the recording characteristics of the recording elements, and error diffusion processing has been carried out by using threshold values which are altered in accordance with the error). The images 80', 82' and 84' shown in FIG. 5B, FIG. 6B and FIG. 7B respectively show schematic representations of the images 80, 82 and 84 shown in FIG. 5A, FIG. 6A and FIG. 7A.

As shown in FIGS. 5A and 5B, a plurality of density non-uniformities 90 (90') extending in the conveyance direction of the recording medium are visible in the image 80 (82') in which density correction processing has not been carried out on the basis of the recording characteristics of the recording elements. Furthermore, in the image 82 (82') in which image processing has been carried out in accordance with the related art, as shown in FIGS. 6A and 6B, the density non-uniformities are reduced in comparison with the image 80 (80') shown in FIGS. 5A and 5B, but it can be seen that visible density non-uniformities 92 still occur, and vertical-striped artifacts 94 (94') appear.

Figure 7B:
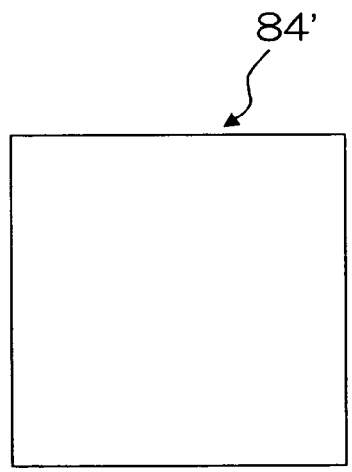

On the other hand, in the images 84 (84') shown in FIGS. 7A and 7B in which image processing has been carried out according to the above embodiment of the present invention, it can be seen that there is no occurrence of visible density non-uniformities or vertical-striped artifacts.

As described above, in the image processing relating to the first embodiment of the present invention, the input data I(i,j) which is calculated by carrying out the multiplication of line correction coefficients $d_i$ corresponding to the recording characteristics of the recording elements is obtained, and the output data O(i,j) is obtained by carrying out binarization processing using an error diffusion process with respect to this input data I(i,j). In this image processing, the threshold values T'(k,l) are obtained by correcting the threshold values T(k,l), which is used in the error diffusion processing on the basis of the error E(i,j) calculated by the formula (4) above, and the binarization processing for the unprocessed pixels is carried out on the basis of the corrected threshold values T'(k,l). Consequently, the line correction coefficients $d_i$ are conserved even after the binarization processing, and the effects of correcting non-uniformities are increased, while at the same time, it is possible to suppress the occurrence of artifacts in the recorded image by improving the dispersion properties of dots.

Here, the recording elements are, for instance, nozzles in an inkjet recording apparatus, LED elements in an LED electrophotographic printer, or the like. Furthermore, the recording characteristics of the recording elements include the ejection characteristics of the nozzles in the inkjet recording apparatus (e.g., the ejection volume, the direction of ejection of the ink droplets, and the like).

Second Embodiment

Figure 8:
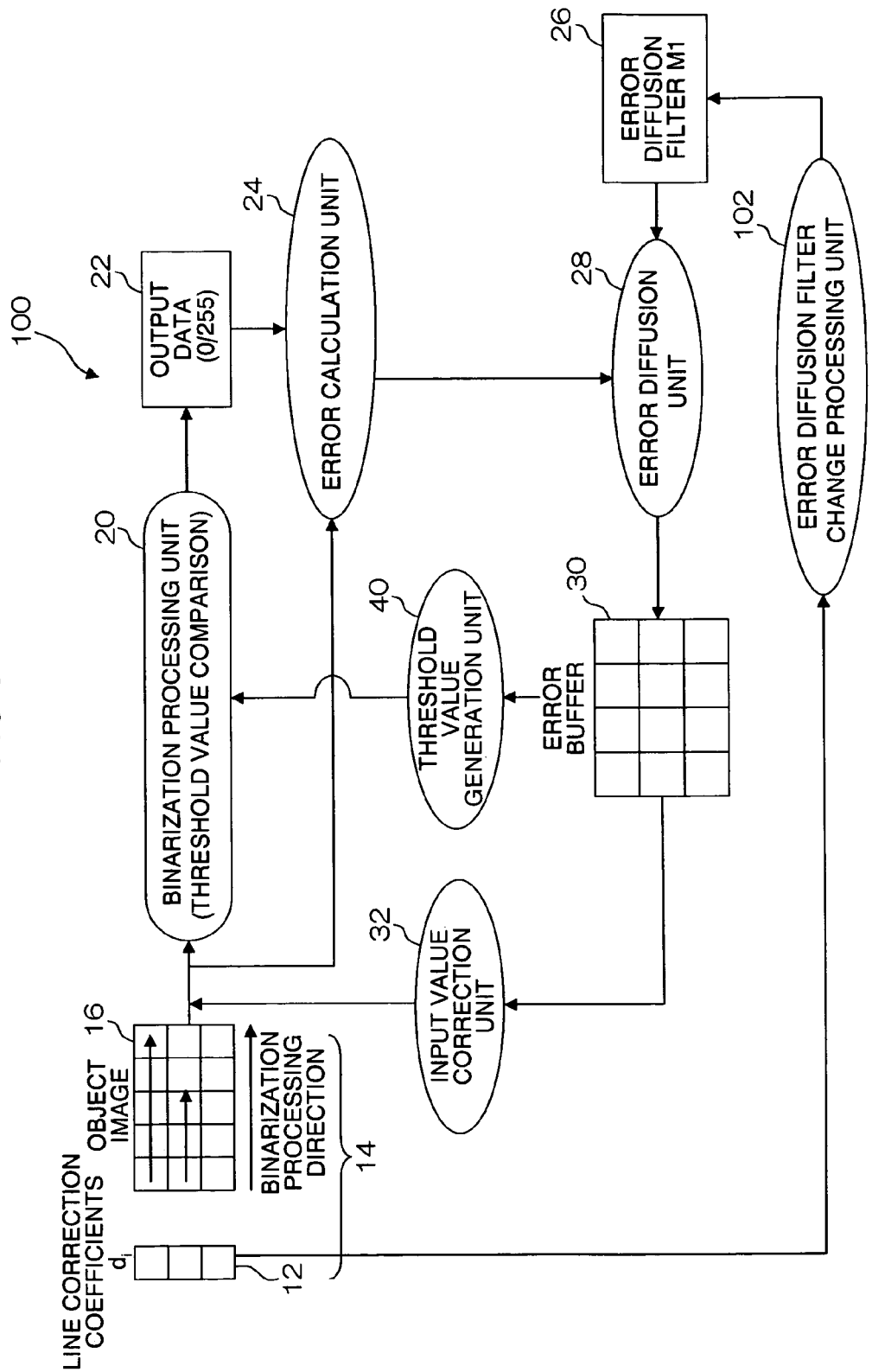
FIG. 8 is a block diagram showing the composition of an image processing block relating to a second embodiment of the present invention.

Next, an image processing method relating to a second embodiment of the present invention is described below. FIG. 8 is a block diagram of an image processing block 100 in which image processing according to the second embodiment of the present invention is executed. The image processing block 100 shown in FIG. 8 comprises an error diffusion filter conversion processing unit 102, instead of the threshold value correction filter 34 and the threshold value correction processing unit 36 of the image processing block 10 shown in FIG. 1. In other words, the image processing shown in the second embodiment is performed in such a manner that the error diffusion filter 26 is changed in accordance with the line correction coefficient $d_i$.

Figure 9A:
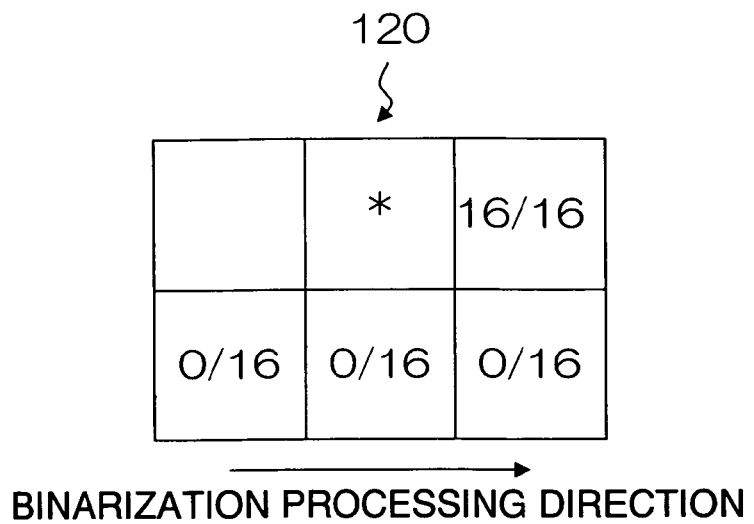
FIGS. 9A to 9C are examples of the error diffusion filter shown in FIG. 8.

In a region where the characteristic error of a recording element (for example, the density error) is large (in other words, a region where $|d_i-1|$ is large, for example, a region where $|d_i-1|>0.5$), high correction accuracy is required, and hence the error diffusion filter 120 shown in FIG. 9A, which has increased weighting in the binarization processing direction, is used. In other words, by means of error diffusion processing using an error diffusion filter which has increased weighting in the binarization processing direction, it is possible to make the print duty ratio $e_i$ approach the value of $d_i$, and hence desirable correction of density non-uniformities is achieved.

Figure 9B:
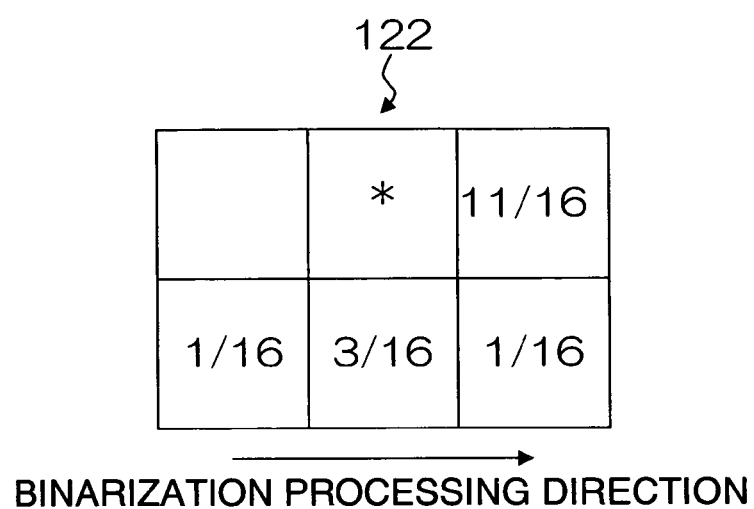

Furthermore, in a region where the characteristic error of the recording element is small (in other words, a region where $|d_i-1|$ is small, for example, a region where $|d_i-1|<0.2$), an error diffusion filter 122 as shown in FIG. 9B, which is similar to a Floyd-type filter, is used. More specifically, according to this embodiment, if it is assumed that the majority of the recording elements can perform the normal printing, then the dot dispersion in the direction parallel to the binarization processing direction is ensured, and density non-uniformity correction is achieved in such a manner that vertical-striped artifacts do not occur.

The sudden switching between filters having different characteristics leads to a problem in that the dot generation characteristics differ according to regions. In order to resolve problems of this kind, it is desirable to successively switch filters between which the change of characteristics is small so as to prevent immediate change in characteristics of the filters. The aforementioned technology is described clearly, for example, in "Reduction of artifacts in error diffusion by means of input-dependent weights" by Reiner Eschbach in the "Journal of Electronic Imaging 2(4)", pp. 352-358, 1993.

Figure 9C:
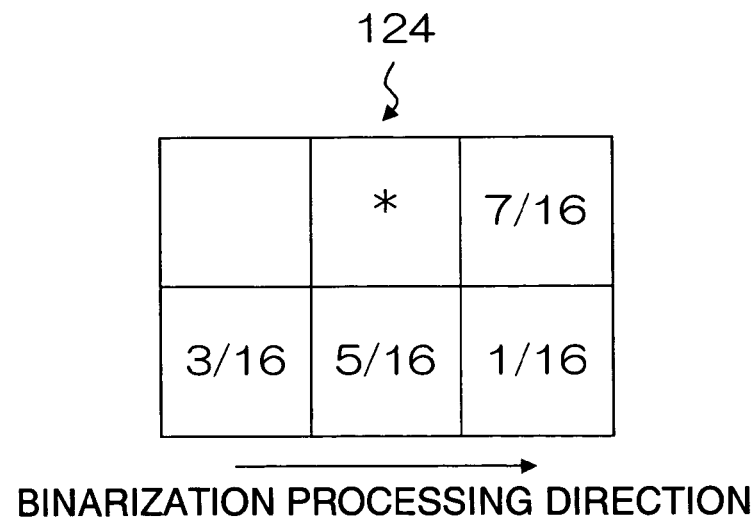

For example, the error diffusion filter 120 shown in FIG. 9A is used in the region where $|d_i-1|>0.5$, the error diffusion filter 122 shown in FIG. 9B is used in the region where $0.2 \leq |d_i-1| \leq 0.5$, and the error diffusion filter 124 shown in FIG. 9C is used in the region where $|d_i-1|<0.2$. In this way, the error diffusion filter is selected appropriately for each region, in such a manner that the error diffusion filter is changed gradually and successively in accordance with the magnitude of the characteristic errors of the recording elements.

As described above, in the image processing method relating to the second embodiment of the present invention, a plurality of error diffusion filters are prepared in advance, the selection (switchover) of error diffusion filter is performed in accordance with the line correction coefficients $d_i$, and the binarization processing is carried out for each of the unprocessed pixels by using the selected error diffusion filter. In this way, the line correction coefficients $d_i$ are preserved and desirable correction of density non-uniformities is achieved. Furthermore, error diffusion filters having a small change are used in mutually adjacent pixels (regions), for example, in such a manner that there is no great change between the error diffusion filters for adjacent pixels (regions) (in other words, in such a manner that the weighting of the error diffusion does not change greatly). Accordingly, it is possible to avoid change in the dot generation characteristics between regions.

Description of Line Correction Coefficient Setting Method

Next, one example of a line correction coefficient setting method used in the present embodiment is described below. This example describes the setting of line correction coefficients (density correction coefficients) for correcting density non-uniformities on the basis of the nozzle ejection characteristics, in an inkjet recording apparatus (image forming apparatus) which forms images by means of ink droplets ejected from nozzles.

Correction Principles

Firstly, the principles of correction are hereby described. In the correction processing for density non-uniformities according to an embodiment of the present invention described here, when correcting the depositing position error of a particular nozzle, correction is performed by using N pieces of nozzles including the particular nozzle and the nozzles surrounding the particular nozzle. As described in detail below, the greater the number of nozzles N used for correction, the greater the correction accuracy.

FIG. 10 is a diagram of a mode before correction. In FIG. 10, the third nozzle (nzl3) from the left in a line head 300 (which is equivalent to a recording head) has a depositing position error, and hence the depositing position is displaced from the ideal depositing position (the origin O) in the rightward direction in the diagram (the main scanning direction indicated by the X axis). Furthermore, the graph shown in the bottom part of FIG. 10 indicates the density profile of the nozzle column direction (main scanning direction), obtained by averaging the print density produced by the droplets ejected from each nozzle in the conveyance direction of the recording medium (the sub-scanning direction). Here, since correction relating to the printing by the nozzle nzl3 is considered in FIG. 10, the density outputs of the nozzles other than the nozzle nzl3 are not shown in FIG. 10.

The initial output density of each of the nozzles nzl1 to nzl5 is $D_i = D_{INI}$ (where i is the nozzle number of 1, 2, 3, 4 or 5, and $D_{INI}$ is a uniform value), the origin O is set at the ideal depositing position of the nozzle nzl3, and the depositing position of each of the nozzles nzl1 to nzl5 is $X_i$.

Here, $D_i$ represents the output optical density of the nozzle when averaged physically in the recording medium conveyance direction, and corresponds to the average of the density data D(i,j) of pixels (where i is the nozzle number, and j is the pixel number in the conveyance direction of the recording medium) taken with respect to "j" in the data processing.

As shown in FIG. 10, the depositing position error of the nozzle nzl3 is represented by the divergence from the origin point O of the density output of the nozzle nzl3 (thick line). Here, the correction of this divergence in the output density is considered.

Figure 11:
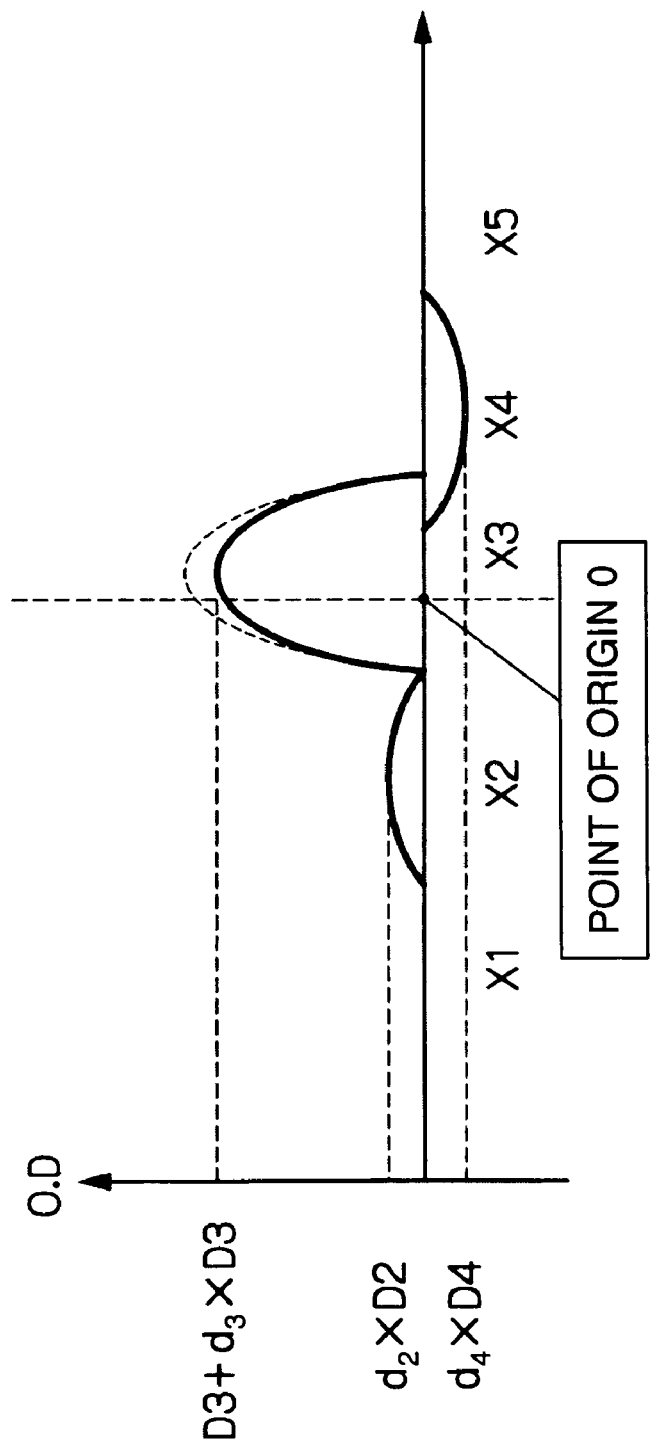
FIG. 11 is an illustrative diagram showing a state after correction of density non-uniformities.

FIG. 11 is a diagram of a mode after correction. Here, only the correction components are shown for the nozzles other than the nozzle nzl3. In the case of FIG. 11, the number of nozzles used in correction is N=3, and density correction coefficients d2, d3, and d4 are applied to the nozzles nzl2, nzl3 and nzl4, respectively. The density correction coefficients $d_i$ described here are defined as $D'_i = D_i + d_i \times D_i$, where $D'_i$ are the output densities after correction.

In the present embodiment, the density correction coefficient $d_i$ of each nozzle is specified so as to minimize the visibility of the density non-uniformity. Density non-uniformities in the print image are represented by the intensities in the spatial frequency characteristics (power spectrum). Since the characteristics of human vision mean that high-frequency components are not readily visible, the visibility of density non-uniformity corresponds to the low-frequency component of the power spectrum. In this case, the density correction coefficient $d_i$ for each nozzle is specified so as to minimize the low-frequency component of the power spectrum.

The details of the derivation of the equation for specifying the density correction coefficient $d_i$ are described later, but to state the result in advance, the density correction coefficient $d_i$ corresponding to the depositing position error of a particular nozzle (correction object nozzle) is specified by means of the following equation:

$$d_i = \begin{cases} \dfrac{\prod_k x_k}{x_i \cdot \prod_{k \neq i}(x_k - x_i)} & \text{(for the correction object nozzle)} \\ \dfrac{\prod_k x_k}{x_i \cdot \prod_{k \neq i}(x_k - x_i)} & \begin{pmatrix} \text{for nozzles other than} \\ \text{the correction object nozzle} \end{pmatrix} \end{cases} \quad (9)$$

where $x_i$ is the depositing position of each nozzle, taking the origin at the ideal depositing position of the correction object nozzle; and $\Pi$ means that the product is found for the N nozzles used for correction. When stated explicitly for the case of N=3 in FIG. 11, the following equations are derived:

$$d_2 = \frac{x_2 \cdot x_3 \cdot x_4}{x_2 \cdot (x_3 - x_2) \cdot (x_4 - x_2)}; \quad (10)$$

$$d_3 = \frac{x_2 \cdot x_3 \cdot x_4}{x_3 \cdot (x_2 - x_3) \cdot (x_4 - x_3)} - 1; \text{ and} \quad (11)$$

$$d_4 = \frac{x_2 \cdot x_3 \cdot x_4}{x_4 \cdot (x_2 - x_4) \cdot (x_3 - x_4)}. \quad (12)$$

Calculation of Density Correction Coefficients

It is possible to logically derive the density correction coefficient for each nozzle from the conditions for minimizing the low-frequency component of the power spectrum of the density non-uniformity.

Firstly, a density profile D(x) incorporating the error characteristics of each nozzle is defined as:

$$D(x) = \sum_i D_i \cdot z(x - x_i), \quad (13)$$

where i is the nozzle number, x is the positional coordinate on the medium (in the nozzle column direction), $D_i$ is the nozzle output density (the height of peak), z(x) is the standard density profile (where x=0 is the center of gravity), and $x_i = \bar{x}_i + \Delta x_i$ is the depositing position of the i-th nozzle (the ideal position+the error).

The density profile D(x) of the image is the sum of the density profiles printed by the nozzles, and the print model represents the printing performed by each nozzle (the density profile printed by each nozzle). The print model is represented separately by the nozzle output density Di and the standard density profile z(x).

The standard density profile z(x) has a limited spread equal to the dot diameter in strict terms, but if the correction of positional errors is considered to be a problem of balancing divergences in the density, then the important element is the central position (depositing position) of the density profile and the spread of the density profile is a secondary factor. Hence, an approximation that converts the profile by means of a δ function is appropriate. When a standard density profile represented with a δ function is supposed, then an arithmetical treatment can be achieved readily, and a precise solution for the correction coefficients can be obtained.

Figures 12A, 12B:
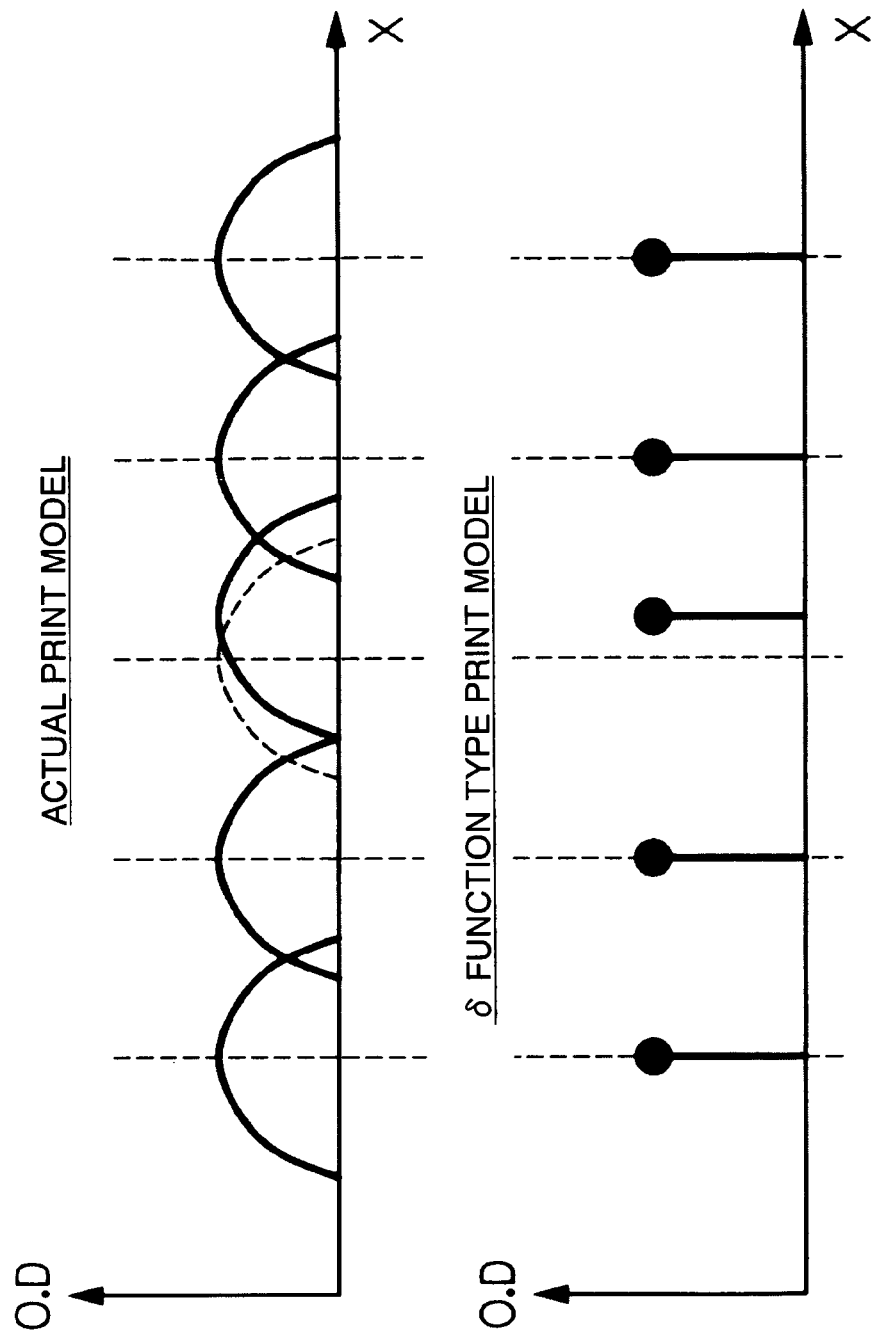
FIG. 12A is a density profile diagram of an actual print model.
FIG. 12B is a density profile diagram of a δ function type of print model.

FIGS. 12A and 12B shows a graph of density profiles of an actual print model and a δ function type of print model, respectively. The standard density profile is represented as approximation using the δ function model as:

$$z(x - x_i) = \delta(x - x_i). \quad (14)$$

In calculating the correction coefficients, it is considered that the depositing position error $\Delta x_0$ of a particular nozzle (i=0) is to be corrected by means of the N pieces of nozzles including the particular nozzle and the nozzles surrounding the particular nozzle. Here, the number of the nozzle to be corrected is i=0. Attention is paid to the fact that each of the surrounding nozzles may also have a prescribed depositing position error.

The numbers (indexes) of the N nozzles including the nozzle to be corrected (central nozzle) are represented as:

Nozzle index:

$$i = -\frac{N-1}{2}, \ldots, -1, 0, 1, \ldots, \frac{N-1}{2}. \quad (15)$$

The number N must be an odd number in this expression, but in implementing the present invention, the number N is not necessarily limited to being an odd number.

The initial output density (the output density before correction) has a value only if i=0, and is represented as follows:

$$D_i = \begin{cases} D_{INI} & (i = 0) \\ 0 & (i \neq 0) \end{cases}. \quad (16)$$

When the density correction coefficients are $d_i$, then the output densities $D'_i$ after correction are represented as follows:

$$D'_i = D_i + d_i \times D_{INI} \quad (17)$$

$$= d'_i \times D_{INI},$$

where $d'_i = \begin{cases} d_i + 1 & (i = 0) \\ d_i & (i \neq 0) \end{cases}.$

In other words, when i=0, the corrected output density is the sum of the initial output density value and the correction value ($d_i \times D_{INI}$), and when i≠0, the corrected output density is equal to the correction value only.

The depositing position $x_i$ of each nozzle i is represented as:

$$x_i = \bar{x}_i + \Delta x_i, \quad (18)$$

where $\bar{x}_i$ is the ideal depositing position, $\Delta x_i$ is the depositing position error, and the ideal depositing position of the correction object nozzle is set as the origin ($\bar{x}_0 = 0$).

When using a δ function type of print model, the density profile after correction is expressed as follows:

$$D(x) = \sum_{i=-(N-1)/2}^{i=(N-1)/2} D'_i \cdot \delta(x - x_i) \quad (19)$$

$$= D_{INI} \cdot \sum_{i=-(N-1)/2}^{i=(N-1)/2} d'_i \cdot \delta(x - x_i).$$

By Fourier transform on this equation, the following equation is obtained:

$$T(f) = \int_{-\infty}^{\infty} D(x) \cdot e^{ifx} dx \quad (20)$$

$$= \sum_i d'_i \cdot \int_{-\infty}^{\infty} \delta(x - x_i) \cdot e^{ifx} dx$$

$$= \sum_i d'_i \cdot e^{ifx_i},$$

where $D_{INI}$ is omitted since it is a common constant.

Minimizing the visibility of density non-uniformities means minimizing the low-frequency components of the power spectrum expressed as:

$$\text{Power spectrum} = \int T(f)^2 df. \quad (21)$$

This can be approximated arithmetically by taking the differential coefficients (of the first-order, the second-order, . . . ) for f=0 in T(f) to be zero. Since there are N unknown numbers $d'_i$, then if conditions are used where the differential coefficients up to the (N−1)-th order are zero, and also including the condition for maintaining the direct current (DC) component, then all (N) of the unknown numbers $d'_i$ can be specified precisely. Thus, the following correction conditions are specified:

DC component: T(f=0)=1 (condition for preserving the DC component); (22)

First-order coefficient:

$$\frac{d}{df}T(f=0)=0; \quad (23)$$

Second-order coefficient:

$$\frac{d^2}{df^2}T(f=0)=0; \quad (24)$$

N−1)-th order coefficient:

$$\frac{d^{N-1}}{df^{N-1}}T(f=0)=0. \quad (25)$$

In the δ function model, when the correction conditions are developed, N simultaneous equations relating to Di are reached by means of a simple calculation. When the correction conditions are rearranged, the following group of conditions (group of equations) is obtained:

$$\Sigma d'_i = 1; \quad (26)$$

$$\Sigma x_i d'_i = 0; \quad (27)$$

$$\Sigma x_i^2 d'_i = 0; \quad (28)$$

$$\Sigma x_i^{N-1} d'_i = 0. \quad (29)$$

The meaning of this group of equations is that the first equation represents the conservation of the DC component and the second equation represents the conservation of the central position. The third and subsequent equations represent the fact that the (N−1)-th moment in the statistical calculation is zero.

The conditional equations thus obtained can be represented with a matrix format as follows:

$$\begin{pmatrix} 1 & \cdots & 1 & \cdots & \cdots & 1 \\ x_{-(N-1)/2} & \cdots & x_0 & \cdots & \cdots & x_{(N-1)/2} \\ x_{-(N-1)/2}^2 & \cdots & x_0^2 & \cdots & x_{(N-1)/2}^2 \\ \vdots & & \ddots & & \vdots \\ \vdots & & & \ddots & \vdots \\ x_{-(N-1)/2}^{N-1} & \cdots & x_0^{N-1} & \cdots & \cdots & x_{(N-1)/2}^{N-1} \end{pmatrix} \begin{pmatrix} d'_{-(N-1)/2} \\ \vdots \\ \vdots \\ d'_0 \\ \vdots \\ d'_{(N-1)/2} \end{pmatrix} = \begin{pmatrix} 1 \\ 0 \\ \vdots \\ 0 \\ \vdots \\ 0 \end{pmatrix}. \quad (30)$$

This coefficient matrix A is a so-called Vandermonde matrix, and it is known that this matrix equation can be converted to the following equation, by using the product of the differences:

$$|A| = \prod_{j>k}(x_j - x_k). \quad (31)$$

It is hence possible to determine the precise solution of d'$_i$ using the Crammer's formula. The detailed sequence of the calculation is omitted here, but by means of algebraic calculation, the following solution is obtained:

$$d'_i = \frac{\prod_k x_k}{x_i \cdot \prod_{k \neq i}(x_k - x_i)}. \quad (32)$$

Therefore, the correction coefficients d$_i$ are determined as follows:

$$d_i = \begin{cases} \dfrac{\prod_k x_k}{x_i \cdot \prod_{k \neq i}(x_k - x_i)} - 1 & (i=0) \\ \dfrac{\prod_k x_k}{x_i \cdot \prod_{k \neq i}(x_k - x_i)} & (i \neq 0) \end{cases} \quad (33)$$

Thus, the precise solution for the density correction coefficients d$_i$ is found, from the conditions where the differential coefficients at the origin of the power spectrum become zero. As the number of nozzles N used in the correction increases, the possibility of making the higher-order differential coefficients become zero increases, and hence, the low-frequency energy becomes smaller and the visibility of non-uniformities is reduced yet further.

In the present embodiment, the conditions where the differential coefficients at the origin become zero are used, but if the differential coefficients become sufficiently small values compared to the differential coefficients before the correction (such as 1/10 of the Values before the correction), rather than being set completely to zero, it is still possible to make the low-frequency components of the power spectrum of the density non-uniformity sufficiently small.

Results of correction using the above-described density correction coefficients

Figure 13:
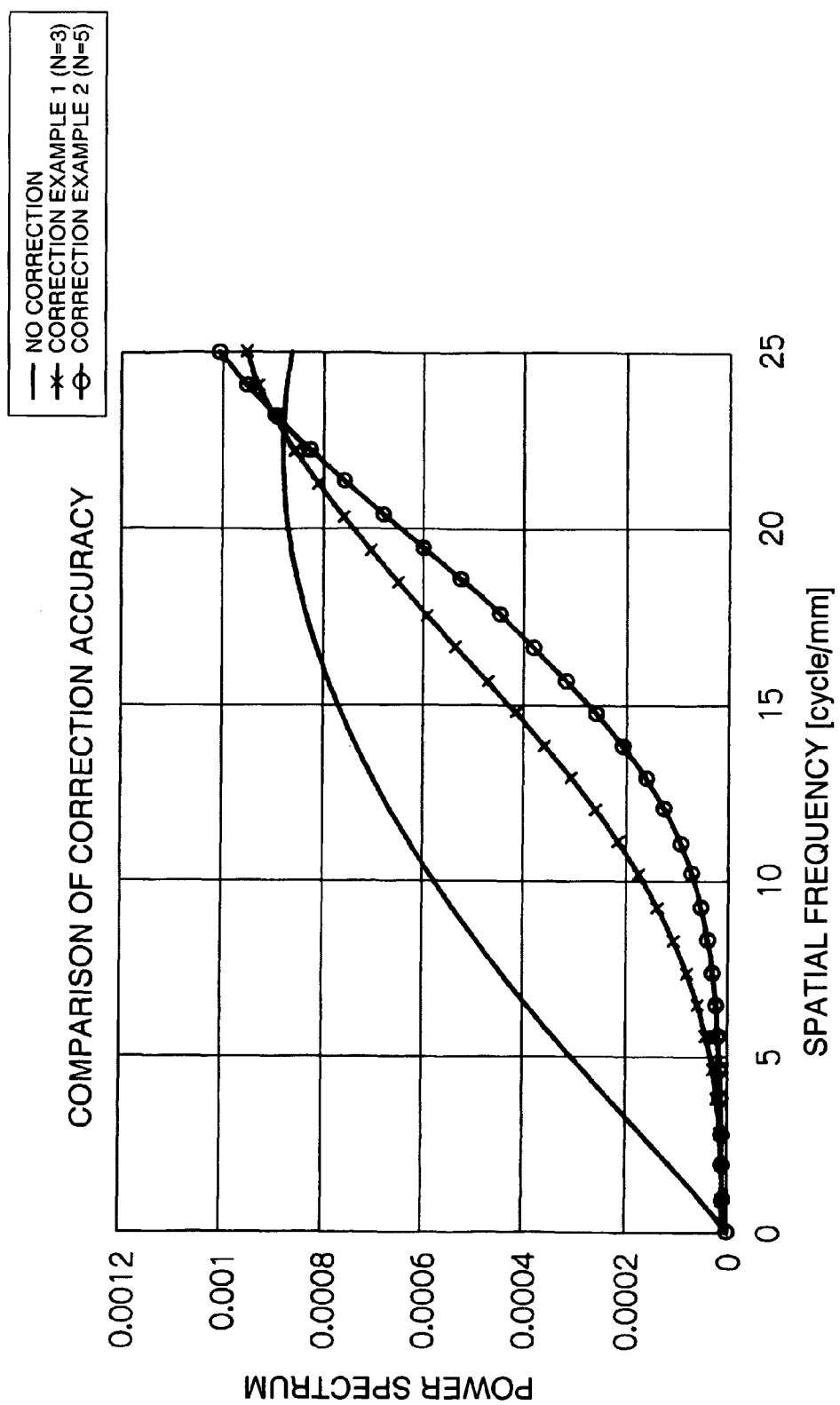
FIG. 13 is a graph of a power spectrum showing the results of correction.

FIG. 13 shows the spatial frequency characteristics (power spectra) after correction for a nozzle having the depositing position error shown in FIG. 10. FIG. 13 shows an example of the correction when N=3 (correction example 1) according to the embodiment of the present invention; and an example of the correction when N=5 (correction example 2) according to the embodiment of the present invention. The common conditions used in the calculations are that: the dot density is 1200 dots per inch (dpi); the diameter of the deposited dot is 32 μm; and the nozzle position error (depositing position error) is 10 μm.

If the human visual characteristics are taken into account, then the visibility of the density non-uniformity is represented by the power spectrum in the low-frequency region of the spatial frequency of 0 cycle/mm to 8 cycle/mm, and the smaller the power spectrum in this region, the greater the correction accuracy.

The correction example 1 (N=3) according to the embodiment of the present invention shows a case where the power spectrum is substantially zero in the region of 0 cycle/mm to 5 cycle/mm, and a suitable correction effect is obtained in comparison with a case where there is no correction. Furthermore, in the correction example 2 (N=5) according to the embodiment of the present invention, the power spectrum is further reduced in comparison with the correction example 1 (N=3). Therefore, the greater the number of nozzles N used in correction, the greater the improvement in the correction effect. In the case of FIG. 10, although the output density of the nozzle nzl3 to be corrected does not project physically into area1 and area5, it is possible further to reduce the power spectrum by using the nozzles nzl1 and nzl5 for correction as well.

Figure 14:
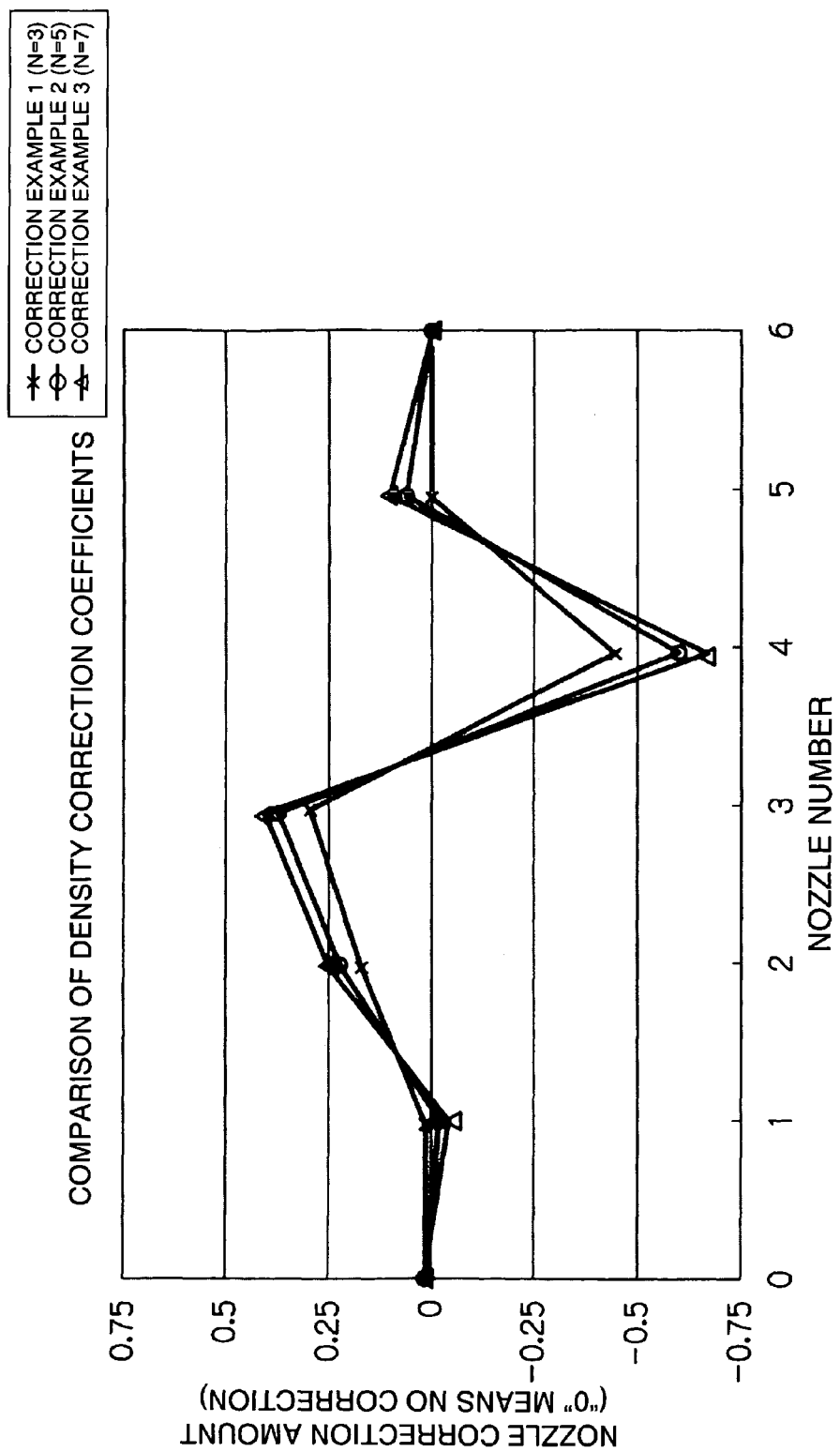
FIG. 14 is a graph used for describing the relationship between the number of nozzles (N) used for correction, and the density correction coefficient.

FIG. 14 shows a comparison of the density correction coefficients of the correction examples 1 to 3 for different numbers of nozzles used in correction. The correction accuracy improves as the value of N increases, as revealed by a comparison between the correction example 1 when N=3 according to the embodiment of the present invention, the correction example 2 when N=5 according to the embodiment of the present invention, and the correction example 3 when N=7 according to the embodiment of the present invention, but the range of the change in the density correction coefficients also increases. Furthermore, naturally, as the depositing position error of the nozzles increases, the range of the change in the density correction coefficients also increases.

If the density correction coefficient increases over a certain value, then this is undesirable since there is a possibility that the reproducibility of the input image is disrupted. Therefore, a greater than necessary increase in the N value is not desirable. Desirably, an optimal N value is set by taking account of both correction accuracy and image reproducibility. In the case of each of the correction examples 1 to 3 for N=3 to 7 shown in FIG. 14, the (absolute value of the) amount of change in the density correction coefficient is relatively small, and therefore density non-uniformities can be corrected without disrupting the reproduction of the input image.

The foregoing description relates to the method of specifying density correction coefficients relating to one particular nozzle (e.g., the nozzle nzl3 in FIG. 10). In actual practice, all of the nozzles in the head have some degree of depositing position errors, and therefore, it is desirable that corrections are performed in respect of all of these depositing position errors.

In other words, the aforementioned density correction coefficients for the surrounding N nozzles are determined with respect to every nozzle. Since the equations for minimizing the power spectra, which are described later and used when specifying the density correction coefficients, are linear, then it is possible to superpose the equations for each nozzle. Therefore, the total density correction coefficient for a nozzle is determined by finding the sum of the density correction coefficients obtained as described above.

More specifically, if the density correction coefficient for a nozzle i in relation to the positional error of a nozzle k is set to be d(i, k), then the value of this d(i, k) is determined by the above-described equation (9), and the total density correction coefficient $d_i$ for the nozzle i is obtained by linear combination of d(i, k) as follows:

$$d_i = \sum_k d(i, k). \qquad (34)$$

In this embodiment, d(i, k) are accumulated for the index k assuming that the depositing position errors of all of the nozzles are to be corrected, but it is also possible to adopt a composition in which a certain value ΔX_thresh is set previously as a threshold value, and correction is performed selectively by setting as objects for correction only those nozzles that have a depositing position error exceeding this threshold value.

As stated above, the accuracy of correction is improved if the value of the number of nozzles N used for the correction is increased, but this also increases the breadth of change of the density correction coefficients and may lead to disruption of the reproduced image. Therefore, desirably, a limit range (a lower limit d_min to an upper limit d_max) is set for the correction coefficients in order to prevent the occurrence of image disruption, and the value N is set in such a manner that the total density correction coefficient determined by the above-described equation (34) comes within this limit range. In other words, the value N is set in such a manner that the relationship of $d\_min < d_i < d\_max$ is satisfied.

From experimental observation, it is known that image disruption does not occur provided that $d\_min \geqq -1$ and $d\_max \leqq 1$.

Image Processing Sequence

Figure 15:
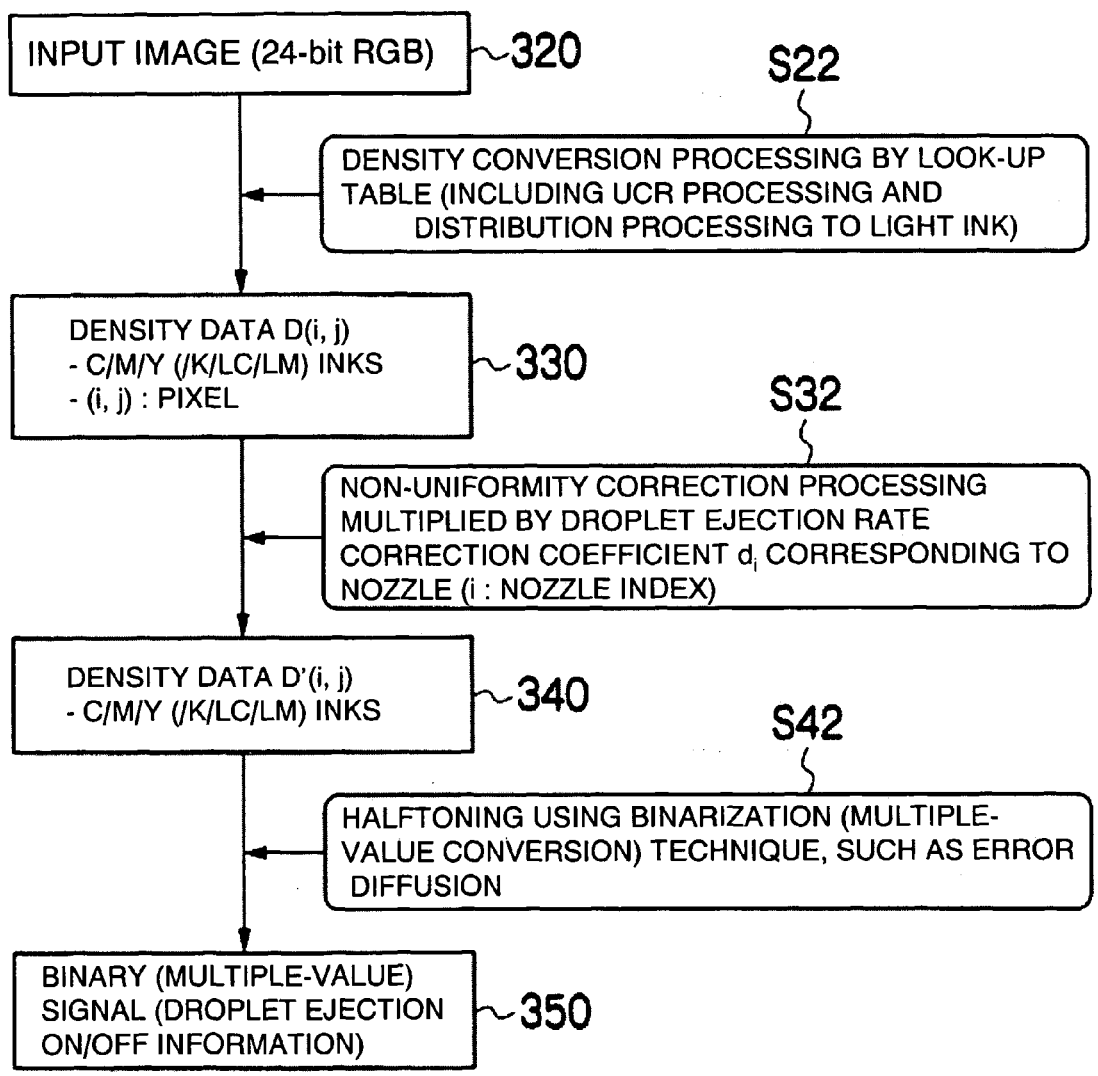
FIG. 15 is a flowchart showing a sequence of density correction processing.

An image processing sequence which incorporates the non-uniformity correction processing according to the present embodiment is shown in FIG. 15.

For example, the input image 320 of 24-bit RGB data is inputted, but there are no particular restrictions on the data format of the input image 320. Density conversion processing based on a look-up table is carried out on this input image 320 (step S22), thereby converting the input image into density data D(i,j) corresponding to the ink colors of the printers. Here, (i,j) indicates the position of a pixel, and hence the density data is assigned to each of pixels.

In this case, is it supposed that the image resolution of the input image 320 matches the image resolution (nozzle resolution) of the printer. If the image resolution of the input image does not match the image resolution (nozzle resolution) of the printer, then pixel number conversion processing is carried out on the input image, in accordance with the resolution of the printer.

The density conversion processing in step S22 uses a general process, which includes under color removal (UCR) processing, light ink distribution processing in the case of a system which uses light inks (light-colored inks of the same color), and so on.

For example, in the case of the printer having a three-ink composition comprising cyan (C), magenta (M) and yellow (Y), the image is converted into CMY density data D(i,j). Alternatively, in the case of the printer having a system which also uses other inks, such as black (K), light cyan (LC), and light magenta (LM) in addition to the three inks of CMY, then the image is converted into density data D(i,j) including these additional ink colors.

Non-uniformity correction processing is carried out with respect to the density data D(i,j) obtained by the density conversion processing (denoted with reference numeral 330 in FIG. 15) (step S32). Here, a calculation is performed in order to multiply the density correction coefficient (ejection rate correction coefficient) $d_i$ corresponding to the related nozzle, by the density data D(i,j).

Figure 16:
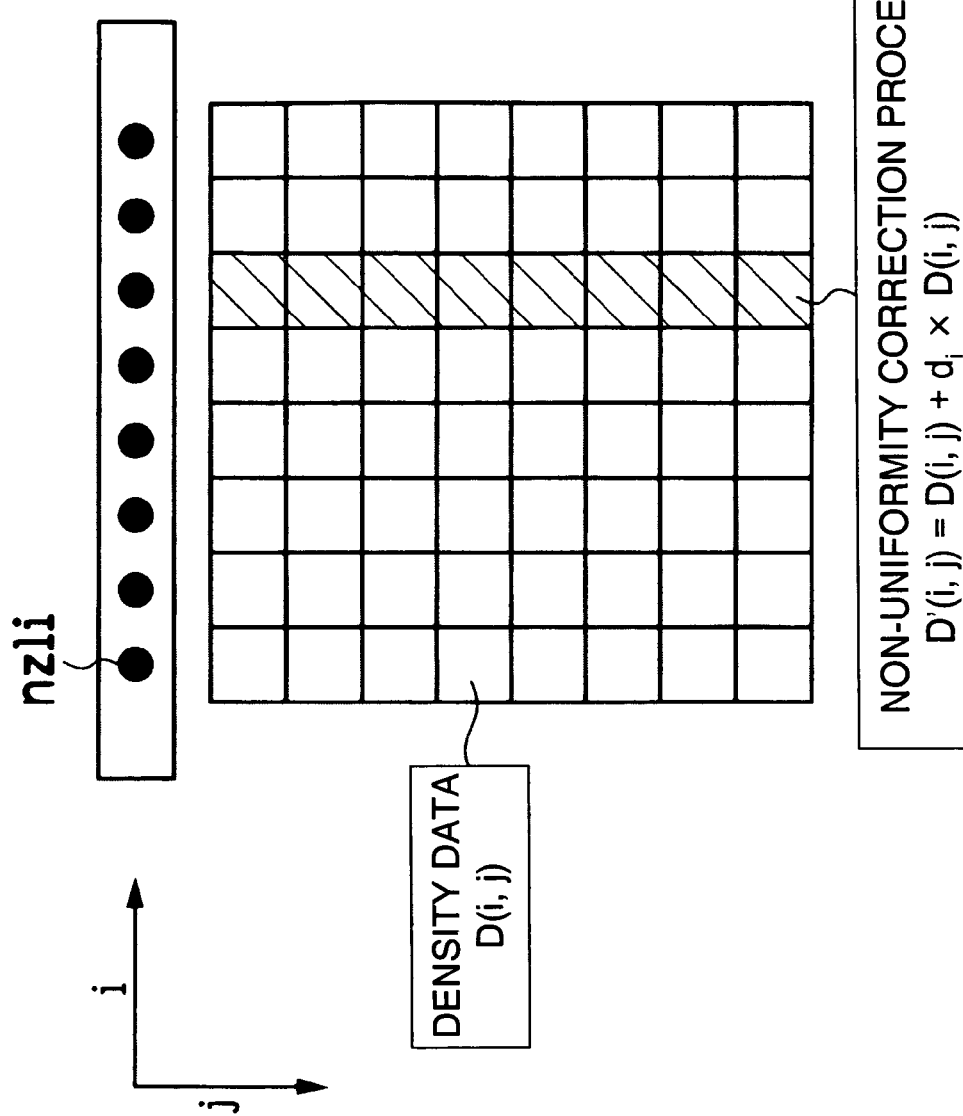
FIG. 16 is a conceptual diagram of non-uniformity correction processing.

As shown in the schematic drawing in FIG. 16, the pixel position (i,j) on the image is specified by the position (main scanning direction position) i of the nozzle nzli, and a sub-scanning direction position j, and the density data D(i,j) is assigned to each of the pixels. If non-uniformity correction processing is carried out for the nozzle that ejects droplets to form the pixel column indicated by the shading in FIG. 16, then the density data D'(i,j) after correction can be calculated by the following equation:

$$D'(i, j) = D(i, j) + d_i \times D(i, j). \qquad (35)$$

The corrected density data D'(i,j) is thus obtained.

By applying a half-toning process to the corrected density data D'(i,j) (denoted with reference numeral 340 in FIG. 15) (step S42), the data is converted into dot on/off signals (in binary data), or alternatively, if the dot sizes are variable, then the data is converted into multiple-value data signals including the size types (selection of dot size). There are no particular restrictions on the half-toning method used, and a commonly known binarizing (or multiple-value conversion) technique, such as error diffusion, dithering, or the like, may be used.

Ink ejection (droplet ejection) data for each nozzle is generated on the basis of the binary (or multiple-value) signals thus obtained (denoted with reference numeral 350 in FIG. 15), and the ejection operation is controlled accordingly. Thus, density non-uniformities are suppressed and images of high quality can be formed.

Figure 17:
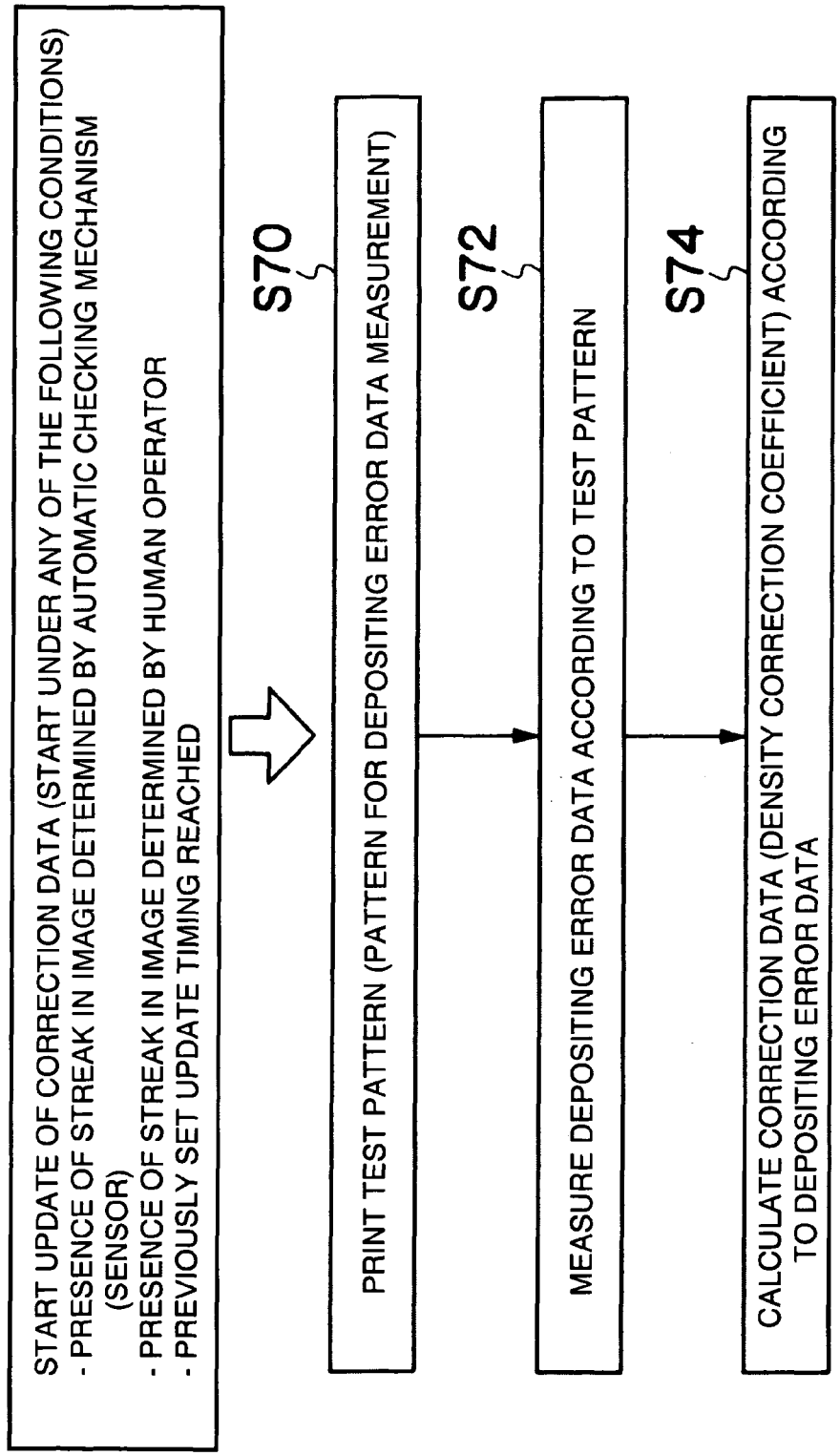
FIG. 17 is a flowchart showing a sequence of processing for updating the correctional data.

FIG. 17 is a flowchart showing an embodiment of a process for updating the density correction coefficients (correction data). The correction data updating process starts when one of the following conditions applies, for instance.

Namely, the update processing shown in FIG. 17 starts if either: (a) an automatic checking device (sensor), which monitors the print result, judges that a non-uniformity streak has occurred in the printed image; or (b) a human observer judges that a non-uniformity streak has occurred in the printed image upon looking at the printed image, and performs a prescribed operation (such as inputting a command to start the updating process); or (c) a previously established update timing has been reached (the update timing can be set and judged by means of time management based on a timer, or the like, or operational record management based on a print counter).

When the update process starts, firstly, a test pattern for obtaining depositing error data (a prescribed pattern which is determined previously) is printed (step S70).

Next, the depositing error data is obtained on the basis of the print result of the test pattern (step S72). For this obtainment of the depositing error data, it is possible to use an image reading device having an image sensor (imaging elements) (including a signal processing device for processing the captured image signal). The depositing error data includes, for example, information on depositing position error, information on optical density information, and the like.

The correction data (density correction coefficients) is calculated from the depositing error data obtained at step S72 (step S74). The method of calculating the density correction coefficients is as described above.

The information relating to the density correction coefficients thus derived is stored in a rewriteable storage device, such as an EEPROM (electronically erasable and programmable read only memory), and subsequently, the most recent correction coefficients are used.

Composition of Inkjet Recording Apparatus

Next, an inkjet recording apparatus is described as a concrete example of the application of an image recording apparatus having the density non-uniformity correction function described above.

Figure 18:
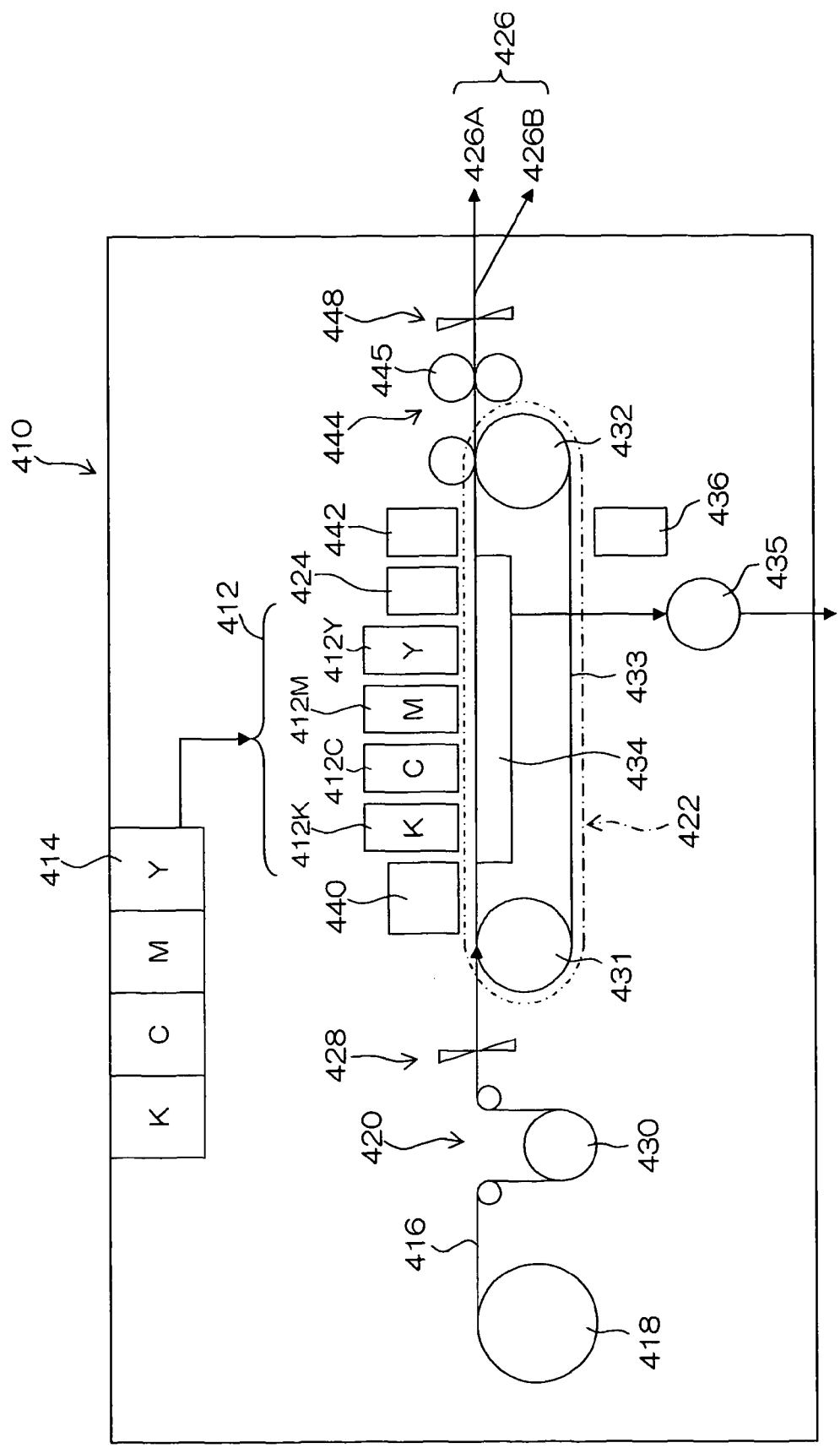
FIG. 18 is a general schematic drawing of an inkjet recording apparatus showing one embodiment of an image recording apparatus relating to an embodiment of the present invention.

FIG. 18 is a general schematic drawing of an image processing apparatus which forms one embodiment of an image recording apparatus relating to the present invention. As shown in FIG. 18, the inkjet recording apparatus 410 comprises: a print unit 412 having a plurality of inkjet recording heads (hereinafter, called heads) 412K, 412C, 412M, and 412Y provided for ink colors of black (K), cyan (C), magenta (M), and yellow (Y), respectively; an ink storing and loading unit 414 for storing inks to be supplied to the heads 412K, 412C, 412M and 412Y; a paper supply unit 418 for supplying recording paper 416 forming a recording medium; a decurling unit 420 for removing curl in the recording paper 416; a belt conveyance unit 422, disposed facing the nozzle face (ink ejection face) of the print unit 412, for conveying the recording paper 416 while keeping the recording paper 416 flat; a print determination unit 424 for reading the printed result produced by the print unit 412; and a paper output unit 426 for outputting recorded recording paper (printed matter) to the exterior.

The ink storing and loading unit 414 has ink tanks for storing the inks of K, C, M and Y to be supplied to the heads 412K, 412C, 412M, and 412Y, and the tanks are connected to the heads 412K, 412C, 412M, and 412Y by means of prescribed channels. The ink storing and loading unit 414 has a warning device (for example, a display device or an alarm sound generator) for warning when the remaining amount of any ink is low, and has a mechanism for preventing loading errors among the colors.

In FIG. 18, a magazine for rolled paper (continuous paper) is shown as an example of the paper supply unit 418; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording medium (media) can be used, it is preferable that an information recording medium such as a bar code and a wireless tag containing information about the type of media is attached to the magazine, and by reading the information contained in the information recording medium with a predetermined reading device, the type of recording medium to be used (type of media) is automatically determined, and ink-droplet ejection is controlled so that the ink-droplets are ejected in an appropriate manner in accordance with the type of medium.

The recording paper 416 delivered from the paper supply unit 418 retains curl due to having been loaded in the magazine. In order to remove the curl, heat is applied to the recording paper 416 in the decurling unit 420 by a heating drum 430 in the direction opposite from the curl direction in the magazine. The heating temperature at this time is preferably controlled so that the recording paper 416 has a curl in which the surface on which the print is to be made is slightly round outward.

In the case of the configuration in which roll paper is used, a cutter (first cutter) 428 is provided as shown in FIG. 18, and the continuous paper is cut into a desired size by the cutter 428. When cut papers are used, the cutter 428 is not required.

The decurled and cut recording paper 416 is delivered to the belt conveyance unit 422. The suction belt conveyance unit 422 has a configuration in which an endless belt 433 is set around rollers 431 and 432 so that the portion of the endless belt 433 facing at least the nozzle face of the printing unit 412 and the sensor face of the print determination unit 424 forms a horizontal plane (flat plane).

The belt 433 has a width that is greater than the width of the recording paper 416, and a plurality of suction apertures (not shown) are formed on the belt surface. A suction chamber 434 is disposed in a position facing the sensor surface of the print determination unit 424 and the nozzle surface of the printing unit 412 on the interior side of the belt 433, which is set around the rollers 431 and 432, as shown in FIG. 18. The suction chamber 434 provides suction with a fan 435 to generate a negative pressure, and the recording paper 416 is held on the belt 433 by suction. It should be noted that electrostatic suction method may be employed instead of adsorption-suction method.

The belt 433 is driven in the clockwise direction in FIG. 18 by the motive force of a motor 488 (shown in FIG. 25) being transmitted to at least one of the rollers 431 and 432, which the belt 433 is set around, and the recording paper 416 held on the belt 433 is conveyed from left to right in FIG. 18.

Since ink adheres to the belt 433 when a marginless print job or the like is performed, a belt-cleaning unit 436 is disposed in a predetermined position (a suitable position outside the printing area) on the exterior side of the belt 433. Although the details of the configuration of the belt-cleaning unit 436 are not shown, examples thereof include a configuration in which the belt 433 is nipped with cleaning rollers such as a brush roller and a water absorbent roller, an air blow configuration in which clean air is blown onto the belt 433, or a combination of these. In the case of the configuration in which the belt 433 is nipped with the cleaning rollers, it is preferable to make the line velocity of the cleaning rollers different than that of the belt 433 to improve the cleaning effect.

The inkjet recording apparatus 410 can comprise a roller nip conveyance mechanism, in which the recording paper 416 is pinched and conveyed with nip rollers, instead of the belt conveyance unit 422. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 440 is disposed on the upstream side of the printing unit 412 in the conveyance pathway formed by the belt conveyance unit 422. The heating fan 440 blows heated air onto the recording paper 416 to heat the recording paper 416 immediately before printing so that the ink deposited on the recording paper 416 dries more easily.

Figure 19:
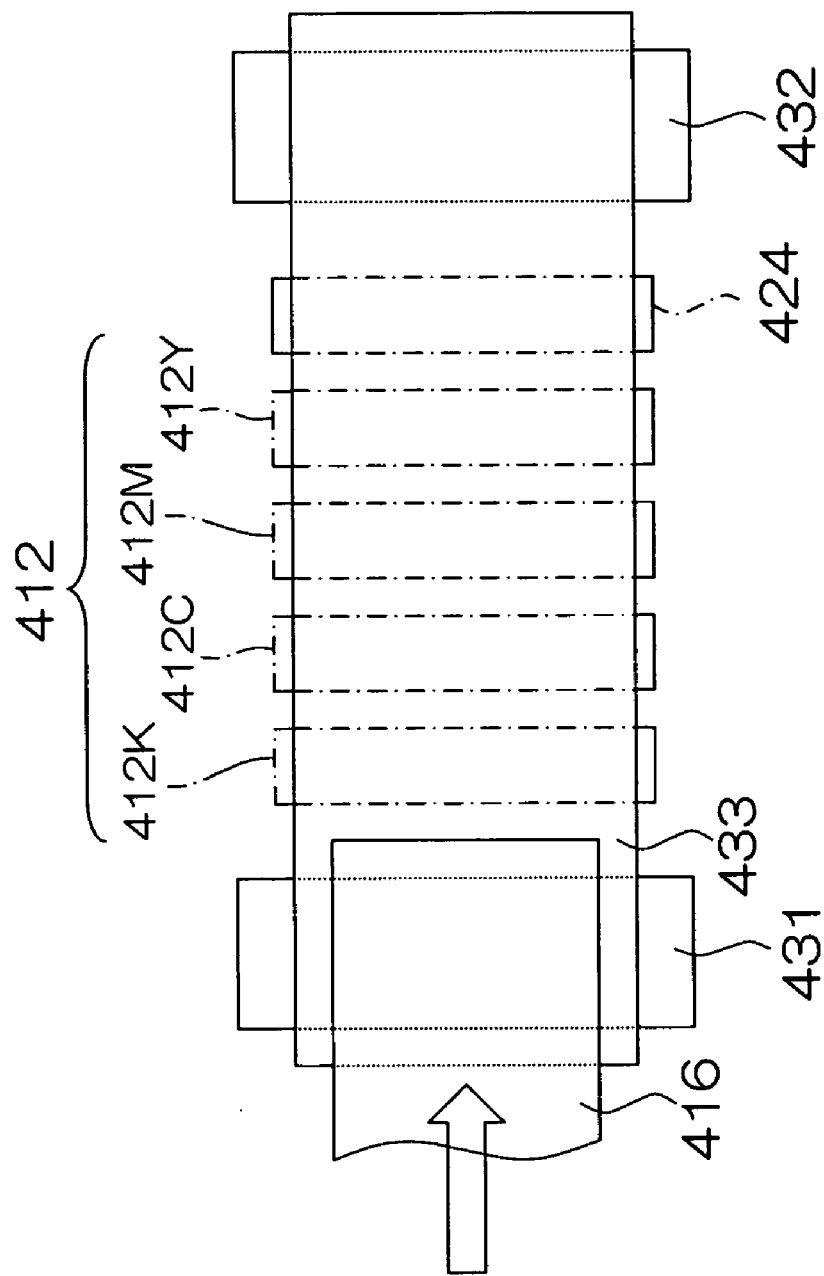
FIG. 19 is a principal plan diagram of the peripheral area of a print unit in the inkjet recording apparatus illustrated in FIG. 18.

The heads 412K, 412C, 412M and 412Y of the printing unit 412 are full line heads having a length corresponding to the maximum width of the recording paper 416 used with the inkjet recording apparatus 410, and comprising a plurality of nozzles for ejecting ink arranged on a nozzle face through a length exceeding at least one edge of the maximum-size recording medium (namely, the full width of the printable range) (see FIG. 19).

The print heads 412K, 412C, 412M and 412Y are arranged in color order (black (K), cyan (C), magenta (M), yellow (Y)) from the upstream side in the feed direction of the recording paper 416, and these respective heads 412K, 412C, 412M and 412Y are fixed extending in a direction substantially perpendicular to the conveyance direction of the recording paper 416.

A color image can be formed on the recording paper 416 by ejecting inks of different colors from the heads 412K, 412C, 412M and 412Y, respectively, onto the recording paper 416 while the recording paper 416 is conveyed by the belt conveyance unit 422.

By adopting a configuration in which the full line heads 412K, 412C, 412M and 412Y having nozzle rows covering the full paper width are provided for the respective colors in this way, it is possible to record an image on the full surface of the recording paper 416 by performing just one operation of relatively moving the recording paper 416 and the printing unit 412 in the recording medium conveyance direction (the sub-scanning direction), in other words, by means of a single sub-scanning action. Higher-speed printing is thereby made possible and productivity can be improved in comparison with a shuttle type head configuration in which a recording head reciprocates in the main scanning direction.

Although the configuration with the KCMY four standard colors is described in the present embodiment, combinations of the ink colors and the number of colors are not limited to those. Light inks, dark inks or special color inks can be added as required. For example, a configuration is possible in which inkjet heads for ejecting light-colored inks such as light cyan and light magenta are added. Furthermore, there are no particular restrictions of the sequence in which the heads of respective colors are arranged.

The print determination unit 424 illustrated in FIG. 18 has an image sensor (line sensor or area sensor) for capturing an image of the droplet ejection result of the print unit 412, and functions as a device to check the ejection characteristics, such as blockages, depositing position error, and the like, of the nozzles, on the basis of the image of ejected droplets read in by the image sensor. A test pattern or the target image printed by the print heads 412K, 412C, 412M, and 412Y of the respective colors is read in by the print determination unit 424, and the ejection performed by each head is determined. The ejection determination includes the presence of ejection, measurement of the dot size, measurement of the dot depositing position, and the like.

A post-drying unit 442 is disposed following the print determination unit 424. The post-drying unit 442 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 444 is disposed following the post-drying unit 442. The heating/pressurizing unit 444 is a device to control the glossiness of the image surface, and the image surface is pressed with a pressure roller 445 having a predetermined uneven surface shape while the image surface is heated, and the uneven shape is transferred to the image surface.

The printed matter generated in this manner is outputted from the paper output unit 426. The target print (i.e., the result of printing the target image) and the test print are preferably outputted separately. In the inkjet recording apparatus 410, a sorting device (not shown) is provided for switching the outputting pathways in order to sort the printed matter with the target print and the printed matter with the test print, and to send them to paper output units 426A and 426B, respectively. When the target print and the test print are simultaneously formed in parallel on the same large sheet of paper, the test print portion is cut and separated by a cutter (second cutter) 448. Although not shown in FIG. 18, the paper output unit 426A for the target prints is provided with a sorter for collecting prints according to print orders.

Structure of the Head

Next, the structure of a head will be described. The heads 412K, 412C, 412M and 412Y of the respective ink colors have the same structure, and a reference numeral 450 is hereinafter designated to any of the heads.

Figure 20:
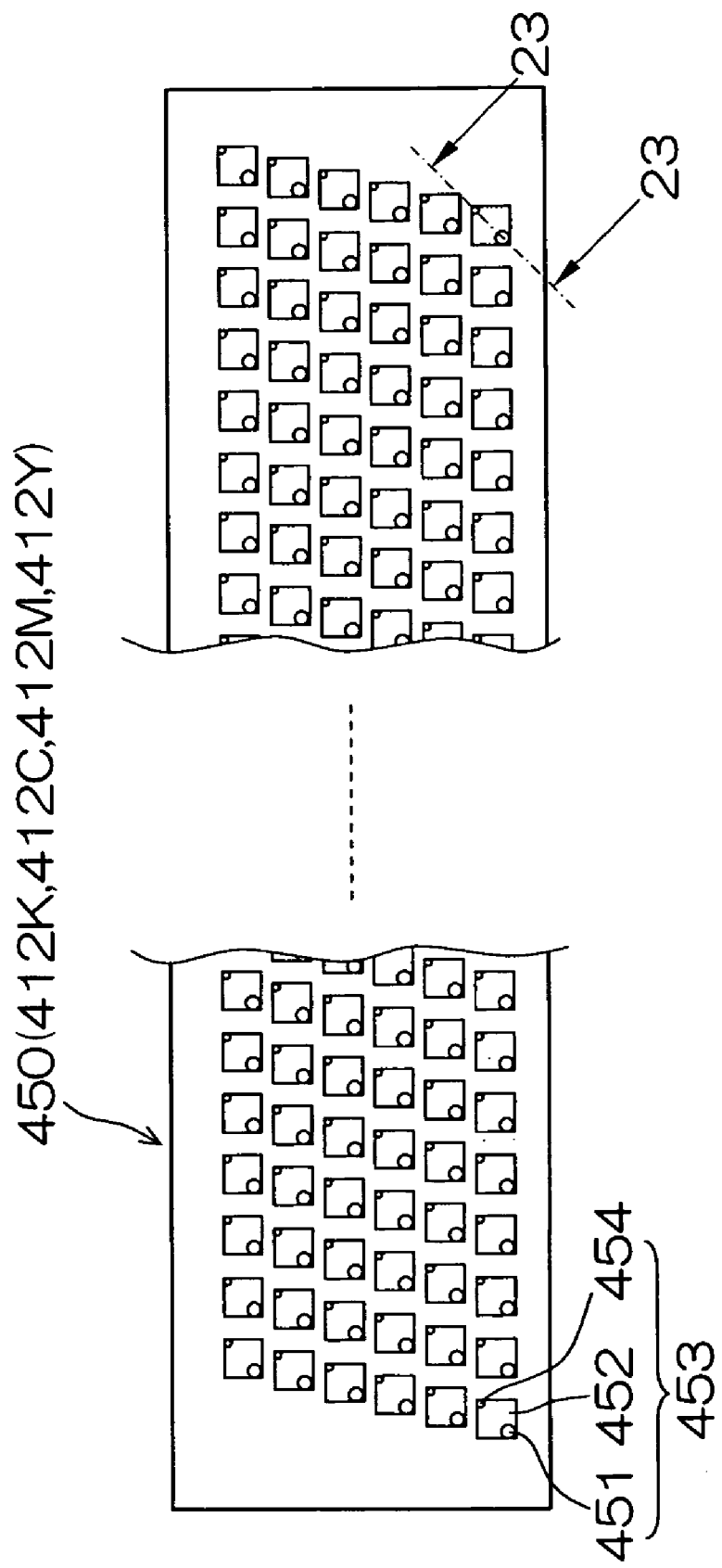
FIG. 20 is a plan view perspective diagram showing an example of the composition of a print head in the inkjet recording apparatus illustrated in FIG. 18.
Figure 21:
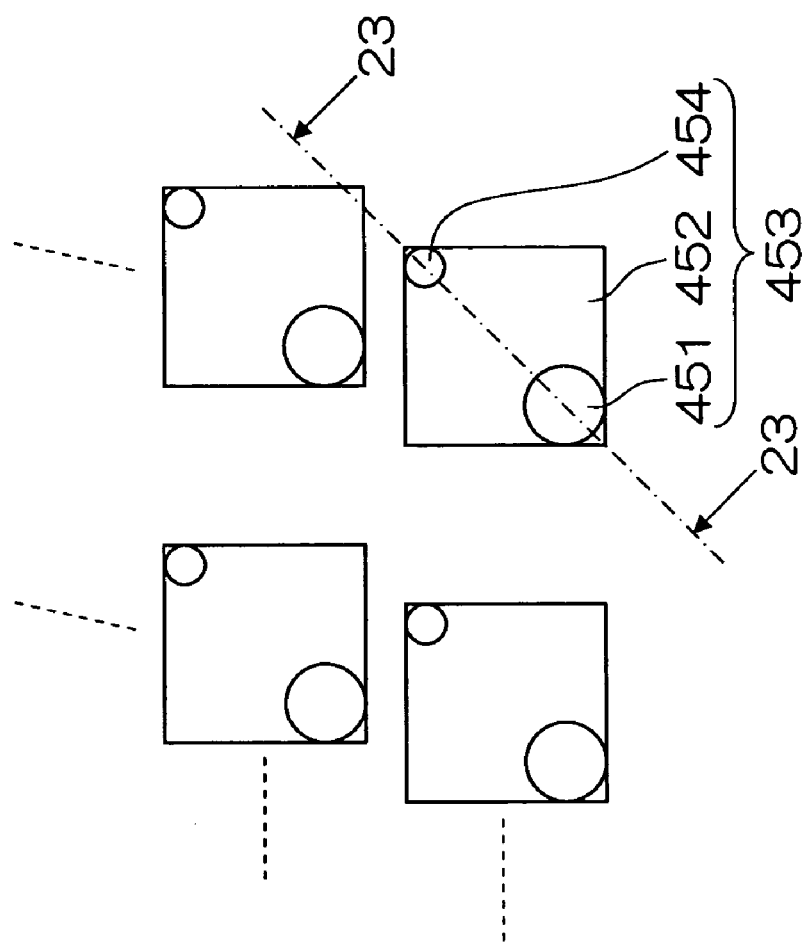
FIG. 21 is a partial enlarged view of FIG. 20.
Figure 22:
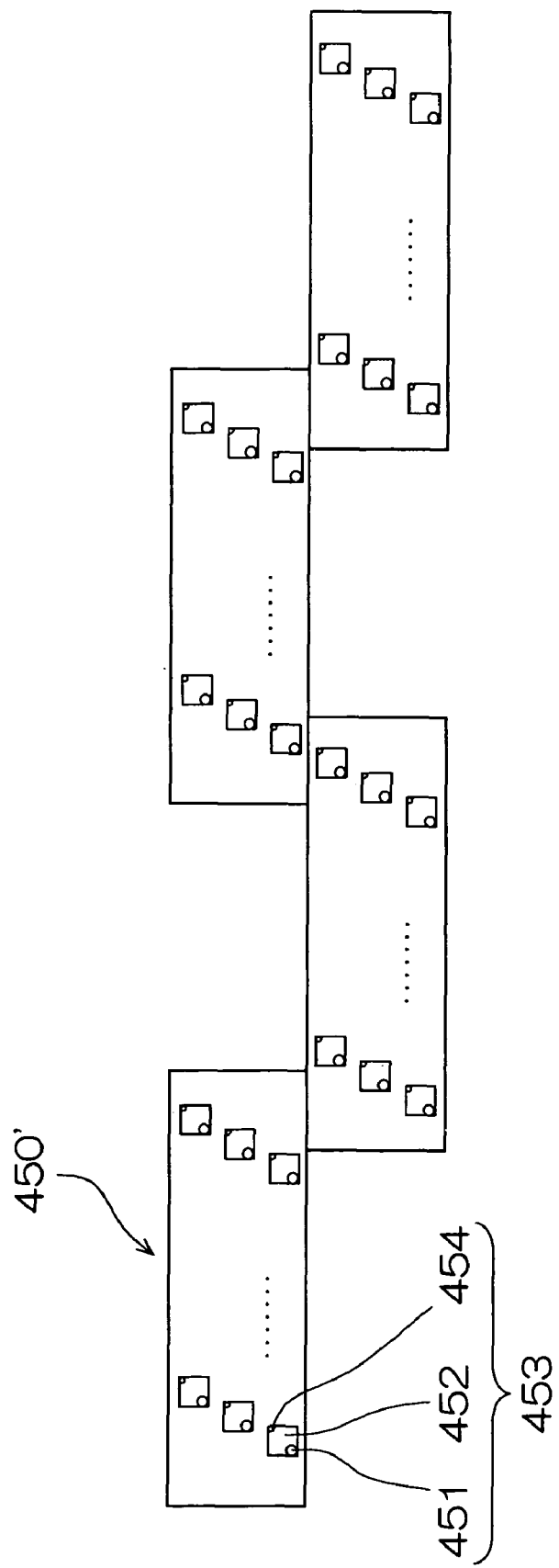
FIG. 22 is a plan view perspective diagram showing a further example of the structure of the full line head shown in FIG. 20.
Figure 23:
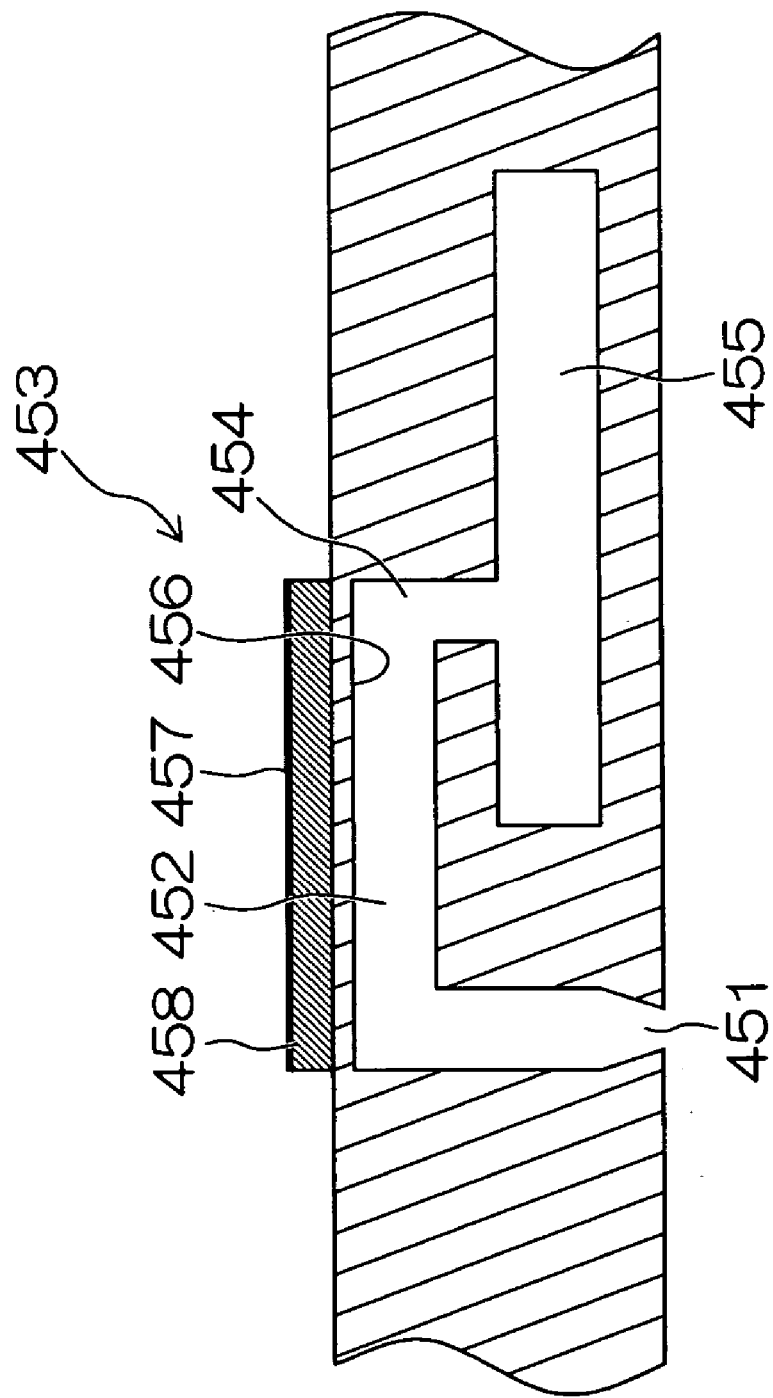
FIG. 23 is a cross-sectional view along line 23-23 in FIG. 21.

FIG. 20 is a plan view perspective diagram showing an example of the structure of a head 450, and FIG. 21 is a partial expanded view of same. Furthermore, FIG. 22 is a plan view perspective diagram showing a further example of the composition of a head 450, and FIG. 23 is a cross-sectional diagram showing a three-dimensional composition of one liquid droplet ejection element (recording element; an ink chamber unit corresponding to one nozzle 451) (being a cross-sectional view along line 23-23 in FIG. 21).

In order to minimize the resolution of the dots printed onto the surface of the recording paper 416, it is necessary to achieve a high density of the nozzle pitch in the head 450. As shown in FIGS. 20 and 21, the head 450 according to the present embodiment has a structure in which a plurality of ink chamber units (liquid droplet ejection elements) 453, each consisting of a nozzle 451 forming an ink ejection port, a pressure chamber 452 corresponding to the nozzle 451, and the like, are disposed two-dimensionally in the form of a staggered matrix, and hence the effective nozzle interval (the projected nozzle pitch) as projected in the lengthwise direction of the head (the direction perpendicular to the recording medium conveyance direction) is reduced (high nozzle density is achieved).

The mode of forming one or more nozzle rows through a length corresponding to the entire width of the recording paper 416 in a direction substantially perpendicular to the conveyance direction of the recording paper 416 is not limited to the example described here. For example, instead of the composition in FIG. 20, as shown in FIG. 22, a line head having nozzle rows of a length corresponding to the entire width of the recording paper 416 can be formed by arranging and combining, in a staggered matrix, short head modules 451 each having a plurality of nozzles 450' arrayed in a two-dimensional fashion.

As shown in FIGS. 20 and 21, the planar shape of the pressure chamber 451 provided corresponding to each nozzle 452 is substantially a square shape, and an outlet port to the nozzle 451 is provided at one of the ends of the diagonal line of the planar shape, while an inlet port (supply port) 454 for supplying ink is provided at the other end thereof. The shape of the pressure chamber 452 is not limited to that of the present embodiment and various modes are possible in which the planar shape is a quadrilateral shape (diamond shape, rectangular shape, or the like), a pentagonal shape, a hexagonal shape, or other polygonal shape, or a circular shape, elliptical shape, or the like.

As shown in FIG. 23, each pressure chamber 452 is connected to a common flow passage 455 via the supply port 454. The common flow channel 455 is connected to an ink tank (not shown), which is a base tank that supplies ink, and the ink supplied from the ink tank is delivered through the common flow channel 455 to the pressure chambers 452.

An actuator 458 provided with an individual electrode 457 is bonded to a pressure plate (a diaphragm that also serves as a common electrode) 456 which forms the surface of one portion (in FIG. 23, the ceiling) of the pressure chambers 452. When a drive voltage is applied to the individual electrode 457 and the common electrode, the actuator 458 deforms, thereby changing the volume of the pressure chamber 452. This causes a pressure change which results in ink being ejected from the nozzle 451. For the actuator 458, it is possible to adopt a piezoelectric element using a piezoelectric body, such as lead zirconate titanate, barium titanate, or the like. When the displacement of the actuator 458 returns to its original position after ejecting ink, the pressure chamber 452 is replenished with new ink from the common flow channel 455, via the supply port 454.

Figure 24:
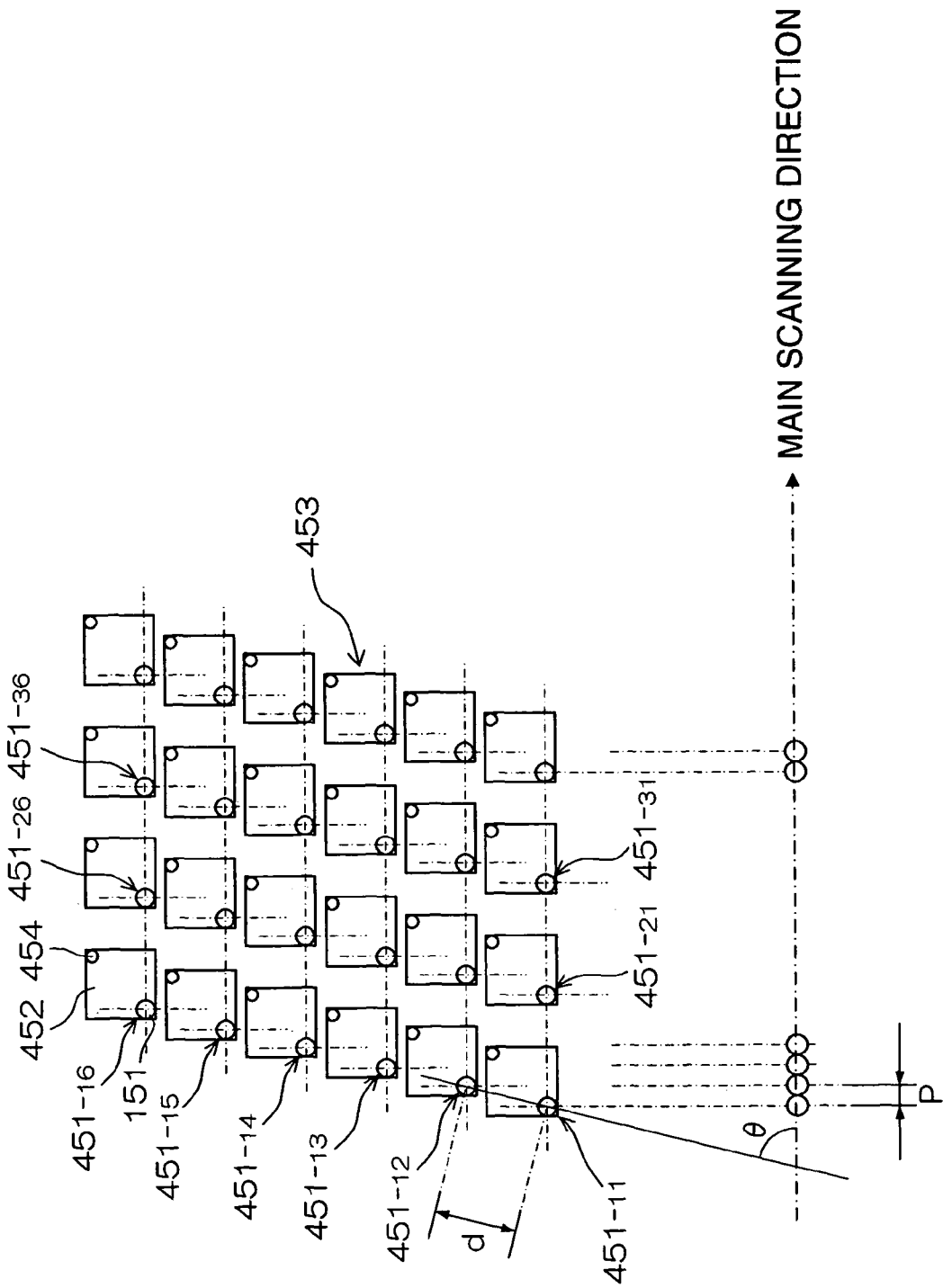
FIG. 24 is an enlarged view showing a nozzle arrangement in the print head shown in FIG. 20.

As shown in FIG. 24, the high-density nozzle head according to the present embodiment is achieved by arranging a plurality of ink chamber units 453 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 453 are arranged at a uniform pitch d in line with a direction forming an angle of θ with respect to the main scanning direction, the pitch P of the nozzles projected so as to align in the main scanning direction is d×cos θ, and hence the nozzles 451 can be regarded to be equivalent to those arranged linearly at a fixed pitch P along the main scanning direction. Such configuration results in a nozzle structure in which the nozzle row projected in the main scanning direction has a high nozzle density of up to 2,400 nozzles per inch.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 451 arranged in a matrix such as that shown in FIG. 24 are driven, the main scanning according to the above-described (3) is preferred. More specifically, the nozzles 451-11, 451-12, 451-13, 451-14, 451-15 and 451-16 are treated as a block (additionally; the nozzles 451-21, . . . , 451-26 are treated as another block; the nozzles 451-31, . . . , 451-36 are treated as another block; . . . ); and one line is printed in the width direction of the recording paper 416 by sequentially driving the nozzles 451-11, 451-12, . . . , 451-16 in accordance with the conveyance velocity of the recording paper 416.

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other.

The direction indicated by one line (or the lengthwise direction of a streak-shaped region) recorded by main scanning as described above is called the "main scanning direction", and the direction in which sub-scanning is performed, is called the "sub-scanning direction". In other words, in the present embodiment, the conveyance direction of the recording paper 416 is called the sub-scanning direction and the direction perpendicular to same is called the main scanning direction.

In implementing the present invention, the arrangement of the nozzles is not limited to that of the example illustrated. Moreover, a method is employed in the present embodiment where an ink droplet is ejected by means of the deformation of the actuator 458, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

Description of Control System

Figure 25:
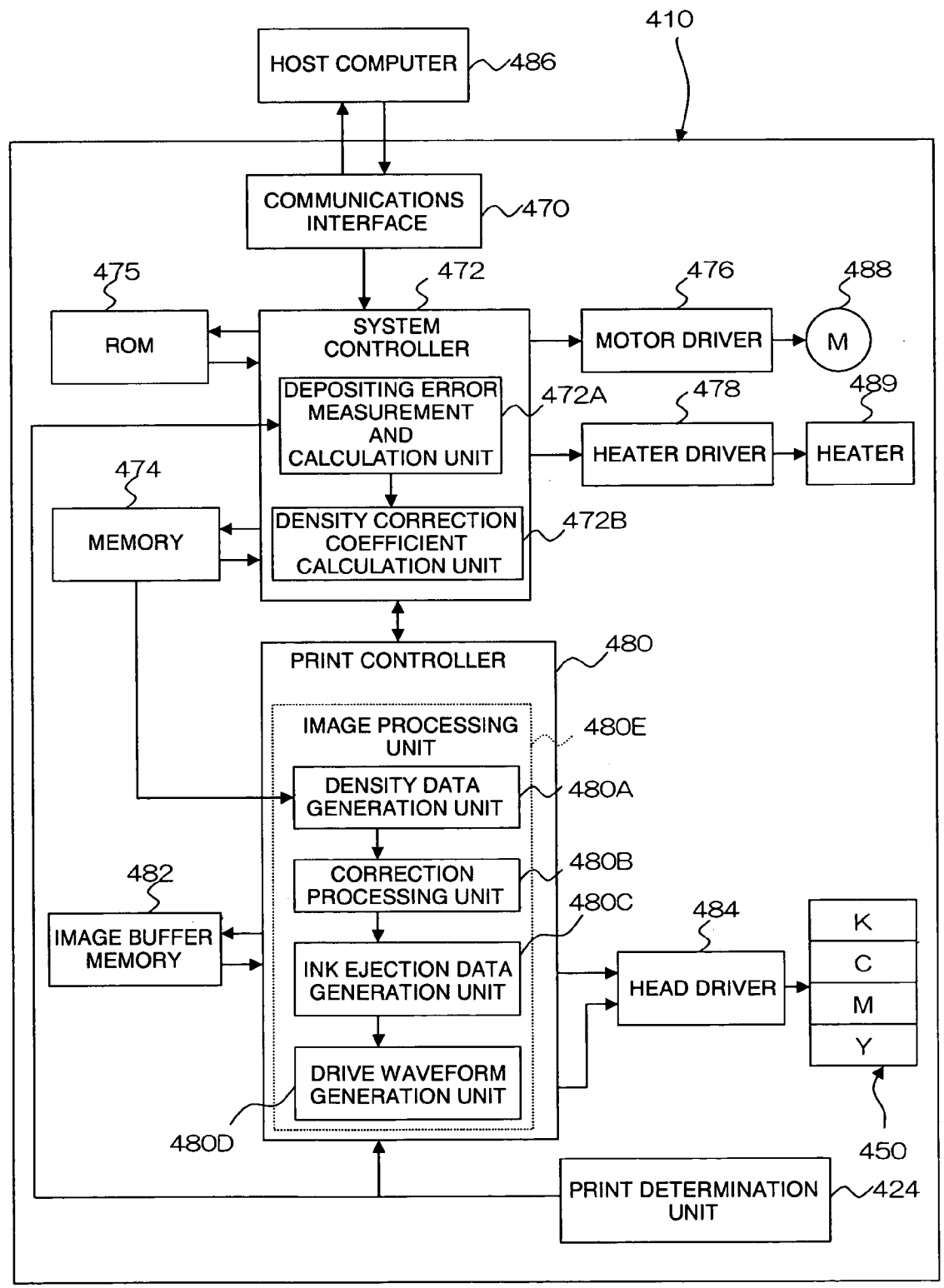
FIG. 25 is a principal block diagram showing a system configuration of the inkjet recording apparatus shown in FIG. 18.

FIG. 25 is a block diagram showing the system composition of the inkjet recording apparatus 410. As shown in FIG. 25, the inkjet recording apparatus 410 comprises a communications interface 470, a system controller 472, a memory 474, a ROM 475, a motor driver 476, a heater driver 478, a print controller 480, an image buffer memory 482, a head driver 484, and the like.

The communications interface 470 is an interface unit (image input device) for receiving image data transmitted by a host computer 486. For the communications interface 470, a serial interface, such as USB (Universal Serial Bus), IEEE 1394, an Ethernet (registered trade name), or a wireless network, or the like, or a parallel interface, such as a Centronics interface, or the like, can be used. It is also possible to install a buffer memory (not illustrated) for achieving high-speed communications.

The image data sent from the host computer 486 is received by the inkjet recording apparatus 410 through the communications interface 470, and is temporarily stored in the memory 474. The image memory 474 is a storage device for storing images inputted through the communications interface 470, and data is written and read to and from the memory 474 through the system controller 472. The memory 474 is not limited to a memory composed of semiconductor elements, and a hard disk drive or another magnetic medium may be used.

The system controller 472 is constituted by a central processing unit (CPU) and peripheral circuits thereof, and the like, and it functions as a control device for controlling the whole of the inkjet recording apparatus 410 in accordance with a prescribed program, as well as a calculation device for performing various calculations. More specifically, the system controller 472 controls the various sections, such as the communications interface 470, memory 474, ROM 475, motor driver 476, heater driver 478, and the like, as well as controlling communications with the host computer 486 and writing and reading to and from the memory 474 and ROM 475, and it also generates control signals for controlling the motor 488 and heater 489 of the conveyance system.

Furthermore, the system controller 472 comprises a deposition error measurement and calculation unit 472A which performs calculation processing for generating depositing position error data on the basis of the read data of the test patter read by the print determination unit 424, and a density correction coefficient calculation unit 472B which calculates density correction coefficients $d_i$ on the basis of the information relating to the depositing position error thus measured. The processing functions of the deposition error measurement and calculation unit 472A and the density correction coefficient calculation unit 472B can be achieved by means of an ASIC, software, or a suitable combination of same.

The density correction coefficient data determined by the density correction coefficient calculation unit 472B is stored in a memory 474.

The ROM 475 stores a program to be executed by the CPU of the system controller 472, and various data required for control operations (including data for an landing position error measurement test pattern described hereinafter), and the like. The ROM 475 may be a non-rewriteable storage device, or it may be a rewriteable storage device, such as an EEPROM. Furthermore, by using a storage region of the ROM 475, a composition is also possible in which the ROM 475 is used as the memory 474.

The memory 474 is used as a temporary storage region for the image data, and it is also used as a program development region and a calculation work region for the CPU.

The motor driver 476 is a driver (drive circuit) which drives the motor 488 of the conveyance system in accordance with instructions from the system controller 472. The heater driver 478 drives the heater 489 of the post-drying unit 442 or the like in accordance with commands from the system controller 472.

The print controller 480 is a control unit which functions as a signal processing device for performing various treatment processes, corrections, and the like, in accordance with the control implemented by the system controller 472, in order to generate a signal for controlling droplet ejection on the basis of the image data (multiple-value input image data) in the memory 474, and functions as a drive control device which controls the ejection driving of the head 450 by supplying the ink ejection data thus generated to the head driver 484.

In other words, the print controller 480 comprises an image processing unit 480E including a density data generation unit 480A, a correction processing unit 480B, an ink ejection data generation unit 480C and a drive waveform generation unit 480D. These functional blocks (480A to 480E) can be realized by means of an ASIC, software or a suitable combination of same.

The density data generation unit 480A is a signal processing device which generates initial density data for the respective ink colors, on the basis of the input image data, and it carries out density conversion processing (including UCR processing and color conversion) as described in step S22 in FIG. 15, and, if necessary, it also performs pixel number conversion processing.

The correction processing unit 480B in FIG. 25 is a processing device which performs density correction calculations using the density correction coefficients ($d_i$) stored in the memory 474, and it carries out the non-uniformity correction processing described in step S32 in FIG. 15.

The ink ejection data generation unit 480C in FIG. 25 is a signal processing device which includes a half-toning processing device for converting the corrected density data generated by the correction processing unit 480B into binary (or multiple-value) dot data, and it performs the binary (multiple-value) conversion processing described in step S42 of FIG. 15. The ink ejection data generated by the ink ejection data generation unit 480C is supplied to the head driver 484, which controls the ink ejection operation of the head 450 accordingly.

The drive waveform generation unit 480D is a device for generating drive signal waveforms in order to drive the actuators 458 (see FIG. 23) corresponding to the respective nozzles 450 of the head 451. The signal (drive waveform) generated by the drive waveform generation unit 480D is supplied to the head driver 484. A signal output from the drive signal generation unit 480D may be digital waveform data, or it may be an analog voltage signal.

Furthermore, the image processing unit 480E shown in FIG. 25 is a block which carries out image processing, such as the binarization processing and the threshold value correction processing described above, and it includes a processor (not illustrated) (the processor may be a dedicated processor used for image processing only, or it may serve as another processor), a memory (which can serve as another memory), and the like.

The print controller 480 is provided with the image buffer memory 482. Image data, parameters, and other data are temporarily stored in the image buffer memory 482 when image data is processed in the print controller 480. FIG. 25 shows a mode in which the image buffer memory 482 is attached to the print controller 480; however, the memory 474 may also serve as the image buffer memory 482. Also possible is a mode in which the print controller 480 and the system controller 472 are integrated to form a single processor.

To give a general description of the sequence of processing from image input to print output, image data to be printed (original image data) is input from an external source via a communications interface 470, and is accumulated in the memory 474. At this stage, for example, multiple-value RGB image data is stored in the memory 474.

In this inkjet recording apparatus 410, an image which appears to have a continuous tonal gradation to the human eye is formed by changing the droplet ejection density and the dot size of fine dots created by ink (coloring material), and therefore, it is necessary to convert the input digital image into a dot pattern which reproduces the tonal gradations (tones) of the image (namely, the light and shade toning of the image) as faithfully as possible. Therefore, original image data (RGB data) stored in the memory 474 is sent to the print controller 480, via the system controller 472, and is converted to the dot data for each ink color by a halftoning technique, using dithering, error diffusion, or the like, by passing through the density data generation unit 480A, the correction processing unit 480B, and the ink ejection data generation unit 480C of the print controller 480.

In other words, the print controller 480 performs processing for converting the input RGB image data into dot data for the four colors of K, C, M and Y. The dot data generated by the print controller 480 in this way is stored in the image buffer memory 482. This dot data which is distinguished by color is converted into CMYK droplet ejection data for ejecting ink from the nozzles of the head 450, and thus the ink ejection data to be printed is determined.

The head driver 484 outputs drive signals for driving the actuators 458 corresponding to the nozzles 451 of the head 450 in accordance with the print contents, on the basis of the ink ejection data and the drive waveform signals supplied by the print controller 480. A feedback control system for maintaining constant drive conditions for the heads may be included in the head driver 484.

By supplying the drive signals output by the head driver 484 to the head 450 in this way, ink is ejected from the corresponding nozzles 451. By controlling ink ejection from the print head 450 in synchronization with the conveyance speed of the recording paper 416, an image is formed on the recording paper 416.

As described above, the ejection volume and the ejection timing of the ink droplets from the respective nozzles are controlled via the head driver 484, on the basis of the ink ejection data and the drive signal waveform generated by implementing required signal processing in the print controller 480 (image processing unit 480E). By this means, desired dot sizes and dot positions can be achieved.

As shown in FIG. 18, the print determination unit 424 is a block including an image sensor. The print determination unit 424 reads in the image printed onto the recording medium 416, performs required signal processing operations, and the like, and thus determines the print situation (presence/absence of ejection, variation in droplet ejection, optical density, and the like). The print determination unit 424 supplies these determination results to the print controller 480 and the system controller 472.

The print controller 480 implements various corrections with respect to the head 450, on the basis of the information obtained from the print determination unit 424, according to requirements. Furthermore, the print controller 480 implements control for carrying out cleaning operations (nozzle restoring operations), such as preliminary ejection, suctioning, or wiping, as and when necessary.

According to the inkjet recording apparatus 410 having the foregoing composition, it is possible to obtain a satisfactory image in which density non-uniformity caused by depositing position error is reduced.

Modification Example

It is also possible to adopt a mode in which all or a portion of the functions carried out by the deposition error measurement calculation unit 472A, the density correction coefficient calculation unit 472B, the density data generation unit 480A, and the correction processing unit 480B shown in FIG. 25, are installed in the host computer 486.

Furthermore, the range of application of the present invention is not limited to the correction of density non-uniformities caused by depositing position error. A correctional effects can also be obtained by applying a method similar to or the same as the correction processing described above to density non-uniformities caused by liquid droplet volume errors, density non-uniformities caused by the presence of nozzles suffering ejection failure, density non-uniformities caused by periodic print errors, and density non-uniformities caused by various other types of factors.

Moreover, the application of the present invention is not limited to a line head type of printer, and beneficial correctional effects can also be obtained with respect to non-uniformity streaks in a shuttle scanning type of printer.

In the foregoing embodiment, an inkjet recording apparatus is described as one example of an image forming apparatus, but the range of application of the present invention is not limited to this. It is also possible to apply the present invention to image recording apparatuses of various types apart from an inkjet apparatus, such as a thermal transfer recording apparatus equipped with a recording head which uses thermal elements as recording elements, an LED electrophotographic printer equipped with a recording head having LED elements as recording elements, and a silver halide photographic printer having an LED line type exposure head, and the like.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording apparatus, comprising:
   a recording head in which a plurality of recording elements are arranged in a prescribed direction;
   an image correction device which corrects an input image in accordance with recording characteristics of the recording elements;
   a quantization processing device which quantizes pixel values of pixels of the corrected input image in a processing direction which is set to a direction substantially parallel to a relative conveyance direction of a recording medium with respect to the recording elements when recording onto the recording medium is performed by means of the recording elements, the pixel value for a pixel under processing being quantized according to a result of a comparison between the pixel value for the pixel under processing and a threshold value for the pixel under processing; and
   an error diffusion device which diffuses an error with respect to the pixel under processing caused by quantizing the pixel value for the pixel under processing, into an unprocessed pixel in a periphery of the pixel under processing, by means of a diffusion filter while changing the diffusion filter in accordance with the recording characteristics of the recording elements and corresponding correction coefficient $d_i$, wherein, if a plurality of the unprocessed pixels are in the periphery of the pixel under processing, the error diffusion device diffuses the error into the unprocessed pixels by using the diffusion filter having a two-dimensional matrix format, and wherein, if a plurality of the unprocessed pixels are in the periphery of the pixel under processing, the error diffusion device increases weighting of the diffusion filter in terms of a direction for an error diffusion processing, in a region of the corrected input image corresponding to at least one of the recording elements which has a large characteristic recording error, wherein said characteristic recording error of the corresponding recording element is large in said region where $|d_i-1|>0.5$.

* * * * *